(12) United States Patent
Amagasaki et al.

(10) Patent No.: US 8,036,251 B2
(45) Date of Patent: Oct. 11, 2011

(54) PACKET TRANSMISSION DEVICE AND CONTROL METHOD THEREOF

(75) Inventors: Hisashi Amagasaki, Fukuoka (JP); Yuichiro Oishi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 179 days.

(21) Appl. No.: 11/882,369

(22) Filed: Aug. 1, 2007

(65) Prior Publication Data

US 2008/0031287 A1   Feb. 7, 2008

(30) Foreign Application Priority Data

Aug. 3, 2006   (JP) ................. 2006-211744

(51) Int. Cl.
*H04J 3/02* (2006.01)
(52) U.S. Cl. .................. 370/537; 370/535; 370/540
(58) Field of Classification Search .................. 370/535, 370/537, 540
See application file for complete search history.

(56) References Cited

U.S. PATENT DOCUMENTS

| 5,818,834 | A  | * | 10/1998 | Skierszkan et al. | 370/366 |
| 6,999,407 | B2 | * | 2/2006  | Moon              | 370/215 |
| 7,403,548 | B2 | * | 7/2008  | Muth et al.       | 370/543 |
| 2001/0053161 | A1 | * | 12/2001 | Tomizawa et al. | 370/538 |
| 2002/0190880 | A1 | * | 12/2002 | McLaughlin et al. | 341/61 |
| 2003/0223467 | A1 | * | 12/2003 | T.                | 370/537 |
| 2005/0063347 | A1 | * | 3/2005  | Sarkkinen et al.  | 370/338 |

FOREIGN PATENT DOCUMENTS

| EP | 1615393 A1 | 1/2006 |
| JP | 11-506893 | 6/1999 |
| JP | 2004-194064 | 7/2004 |
| WO | 97/29613 | 8/1997 |

OTHER PUBLICATIONS

3GPP ETSI TR 125 950; *Universal Mobile Telecommunication System (UMTS); Utra High Speed Dowlink Packet Access*; V4.0.0 (Mar. 2001); 28 pages.
3GPP ETSI TS 125 322; *Universal Mobile Telecommunications System (UMTS); Radio Link Control (RLC) Protocol Specification*; V7.1.0 (Jun. 2006); 87 pages.
Extended European Search Report; Application No. 07113721.0-2412; Reference No. P108994EP00/CLH; date Dec. 18, 2007; 9 pages.
Communication from the Chinese Patent Office dated Nov. 27, 2009 and issued in the corresponding Chinese patent application.
Communication from the Chinese Patent Office dated May 25, 2011 and issued in the corresponding Chinese patent application.

* cited by examiner

*Primary Examiner* — Jason Mattis
(74) *Attorney, Agent, or Firm* — Staas & Halsey LLP

(57) ABSTRACT

In a packet transmission device and control method thereof which can improve the transmission rate of a packet without adding a high speed user data-conversion card, when packet data is inputted through a single arbitrary channel among a plurality of channels, from among a predetermined number of low speed user data-conversion cards provided common to the plurality of channels, the low speed user data-conversion cards by a number corresponding to a ratio between an output transmission rate of the low speed user data-conversion card and an input transmission rate of the packet data are extracted. The packet data is sequentially and cyclically distributed to the low speed user data-conversion cards extracted. Predetermined length user data outputted from the low speed user data-conversion cards are converted into a frame of HSDPA (High Speed Downlink Packet Access) system and multiplexed into a single channel HS-DSCH (High Speed Downlink Shared Channel) to be outputted.

14 Claims, 18 Drawing Sheets

| CARD ID | USED RESOURCE AMOUNT (%) |
|---------|--------------------------|
| 310_1   | 55                       |
| 310_2   | 60                       |
| 310_3   | 68                       |
| 310_4   | 70                       |
| 310_5   | 75                       |
| 310_6   | 80                       |
| ⋮       | ⋮                        |
| 310_j   | 70                       |

FIG.5A

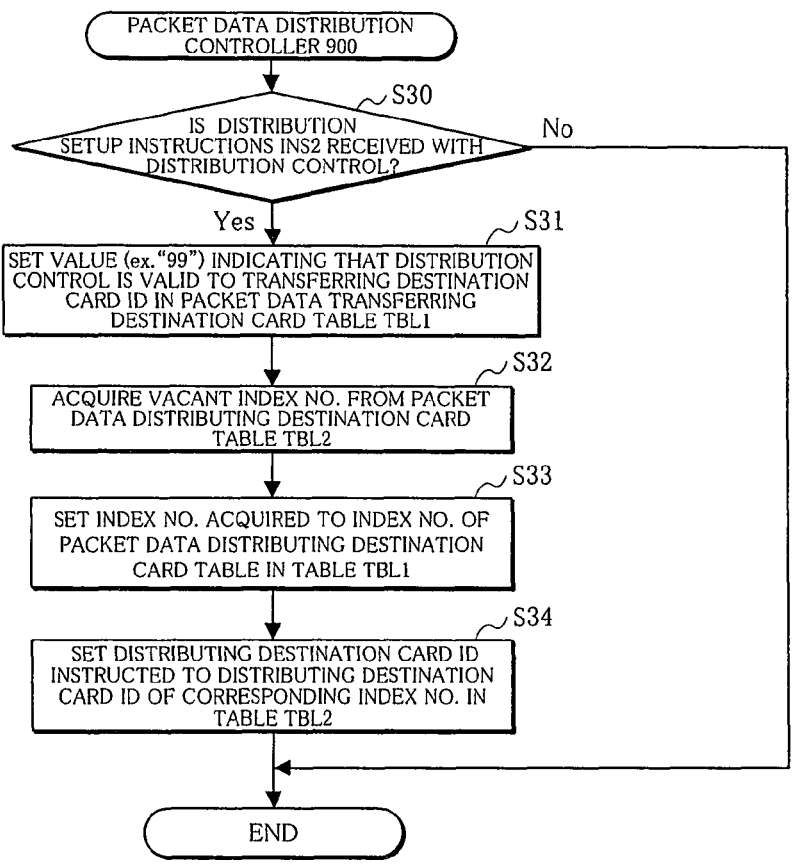

FIG.5B  TBL1

| CHANNEL ID | TRANSFERRING DESTINATION CARD ID | INDEX NO. OF PACKET DATA DISTRIBUTING DESTINATION CARD TABLE |
|---|---|---|
| CH1 | 99 | 0 |
| CH2 | 99 | 1 |
| CH3 | – | – |
| CH4 | – | – |
| ⋮ | ⋮ | ⋮ |
| CHi | – | – |

FIG.5C  TBL2

| INDEX NO. | DISTRIBUTION COUNTER | DISTRIBUTING DESTINATION CARD ID (DISTRIBUTION COUNTER="1") | DISTRIBUTING DESTINATION CARD ID (DISTRIBUTION COUNTER="2") | DISTRIBUTING DESTINATION CARD ID (DISTRIBUTION COUNTER="3") |
|---|---|---|---|---|
| 0 | 1 | 310_1 | 310_2 | 310_3 |
| 1 | 2 | 310_4 | 310_5 | 310_6 |
| 2 | – | – | – | – |
| ⋮ | ⋮ | ⋮ | ⋮ | ⋮ |
| i | – | – | – | – |

| CARD ID | USED RESOURCE AMOUNT (%) |
|---|---|
| 310_1 | 55 |
| 310_2 | 60 |
| 310_3 | 68 |
| 310_4 | 70 |
| 310_5 | 75 |
| 310_6 | 80 |
| ⋮ | ⋮ |
| 310_j | 70 |

| CARD ID | USED RESOURCE AMOUNT (%) |
|---|---|
| 320_1 | 98 |
| 320_2 | 100 |
| 320_3 | 99 |

TBL1

| CHANNEL ID | TRANSFERRING DESTINATION CAND ID | INDEX NO. OF PACKET DATA DISTRIBUTING DESTINATION CARD TABLE |
|---|---|---|
| CH1 | 99 | 0 |
| CH2 | 99 | 1 |
| CH3 | 320_1 | - |
| CH4 | - | - |
| ⋮ | ⋮ | ⋮ |
| CHi | - | - |

TBL2

| INDEX NO. | DISTRIBUTION COUNTER | DISTRIBUTING DESTINATION CARD ID (DISTRIBUTION COUNTER="1") | DISTRIBUTING DESTINATION CARD ID (DISTRIBUTION COUNTER="2") | DISTRIBUTING DESTINATION CARD ID (DISTRIBUTION COUNTER="3") |
|---|---|---|---|---|
| 0 | 1 | 310_1 | 310_2 | 310_3 |
| 1 | 2 | 310_4 | 310_5 | 310_6 |
| 2 | - | - | - | - |
| ⋮ | ⋮ | ⋮ | ⋮ | ⋮ |
| i | - | - | - | - |

US 8,036,251 B2

PACKET TRANSMISSION DEVICE AND CONTROL METHOD THEREOF

BACKGROUND OF THE INVENTION

1. Field of the Invention

The present invention relates to a packet transmission device and control method thereof, and in particular to a packet transmission device for dividing packet data inputted into predetermined length user data to be outputted and a control method thereof.

2. Description of the Related Art

Prior art examples [1] and [2] of a packet transmission technology as mentioned above will now be described referring to FIGS. 16-18.

A radio communication system 1 shown in FIG. 16 indicates an arrangement of a system to which the prior art examples [1] and [2] are applied and is composed of a core network 10, two radio network control devices 20_1 and 20_2 (hereinafter, occasionally represented by a reference numeral 20) connected to the core network 10, four base stations 30_1-30_4 (hereinafter, occasionally represented by a reference numeral 30) managed by the radio network control device 20, and a mobile equipment 40 connecting a call to the radio network control device 20_1 through the base station 30_1.

A downlink packet transmission (core network 10 mobile equipment 40) in the radio communication system 1 is performed, as shown by the solid lines in FIG. 16, by the radio network control device 20_1 dividing packet data SDU (Service Data Unit) received from the core network 10 into user data PDU (Protocol Data Unit), with a size prescribed by an RLC (Radio Link Control) protocol, to be transmitted to the mobile equipment 40 through the base station 30.

Also, an uplink packet transmission (mobile equipment 40→core network 10) is performed, as shown by the dotted lines in FIG. 16, by the radio network control device 20_1 assembling the user data PDU received from the mobile equipment 40 through the base station 30 into the packet data SDU to be transmitted to the core network 10 (see e.g. patent document 1).

Recently, an introduction of an HSDPA (High Speed Downlink Packet Access) system which enables a high speed downlink packet transmission has been considered as a packet transmission standard in such a radio communication system 1. The HSDPA system, where the packet transmission is performed by using a common channel called an HS-DSCH (High Speed Downlink Shared Channel), realizes communications at a maximum transmission rate "14.4 Mbps" exceeding a maximum transmission rate "2 Mbps" of the existing packet transmission standard.

Prior Art Example [1]: FIG. 17

FIG. 17 is a diagram where an arrangement of the radio network control device 20 is emphatically shown within the radio communication system 1 shown in FIG. 16.

The radio network control device 20 is composed of a core network interface 100 connected to the core network 10 through "i" units of channels CH1-CHi (hereinafter, occasionally represented by a reference character CH), a packet data transfer function 200 transferring the packet data SDU received through the core network 100 to the inside of the device 20 itself, a user data converter 300 dividing the packet data SDU transferred from the packet data transfer function 200 into predetermine length user data PDU to be outputted, an HSDPA frame converter 400 converting the user data PDU outputted from the user data converter 300 into a frame (hereinafter, referred to as HSDPA frame) FR with a format prescribed by the HSDPA system to be outputted by using the HS-DSCH, and a base station interface 500 transmitting the HSDPA frame outputted from the HSDPA frame converter 400 to the mobile equipment 40 through the base station 30.

Also, the user data converter 300 has low speed user data-conversion cards 310_1-310_i (hereinafter, occasionally represented by a reference numeral 310) provided corresponding to each of the channels CH1-CHi. It is to be noted that the low speed user data-conversion card 310 is generally used in the radio communication system 1 to which the above-mentioned existing packet transmission standard is applied, and has a resource amount (e.g. a capacity or the like of a memory (not shown) for temporarily storing the packet data SDU) in order to process the packet data SDU transmitted by a sufficient data amount within the maximum transmission rate "2 Mbps" of the packet transmission standard.

In operation, as shown in FIG. 17, when 3 pieces of packet data SDU1-SDU3 are inputted through the channel CH1 for example, the packet transfer function 200 transfers the packet data SDU1-SDU3 to the low speed user data-conversion card 310_1 provided corresponding to the channel CH1.

The low speed user data-conversion card 310_1 having received the packet data SDU1-SDU3 divides the packet data SDU1-SDU3 respectively into the predetermined length user data PDU1_1-PDU1_k, PDU2_1-PDU2_1, and PDU3_1-PDU3_m to be provided to the HSDPA frame converter 400.

The HSDPA frame converter 400 generates, upon every receipt of the user data PDU, the HSDPA frame FR having a predetermined header HD_FR added to a predetermined number of the user data PDUs, and transmits it to the mobile equipment 40 through the base station interface 500.

In such a prior art example [1], the processing of the low speed user data-conversion card 310 is congested with a speed-up of the transmission rate due to the introduction of the HSDPA system, so that a transmission delay of the user data PDU may occur.

In order to address this problem, a prior art example [2] which will be described hereinafter has already been proposed.

Prior Art Example [2]: FIG. 18

FIG. 18 shows a radio network control device 20 where the low speed user data-conversion cards 310_1-310_i shown in FIG. 17 are respectively replaced with high speed user data-conversion cards 320_1-320_i (hereinafter, occasionally represented by a reference numeral 320) which can output the user data PDU at the maximum transmission rate prescribed by the HSDPA system.

In this case, the high speed user data-conversion card 320 can output the user data PDU without an occurrence of the transmission delay, thereby enabling the radio network control device 20 to fast transmit the HSDPA frame FR to the mobile equipment 40.

[Patent document 1] Japanese Patent Application Laid-open No. 2004-194064

In the above-mentioned prior art example [2], it is possible to enhance a speed of the transmission rate of a packet by newly using (adding) a high speed user data-conversion card. However, since such a high-performance conversion card is expensive, there has been a problem of development costs being increased. Also, it is preferable to use such a high speed user data-conversion card as few as possible in terms of an effective use of the existing resource such as the existing low speed user data-conversion card.

SUMMARY OF THE INVENTION

It is accordingly an object of the present invention to provide a packet transmission device and control method thereof which can improve the transmission rate of a packet without adding a high speed user data-conversion card.

[1] In order to achieve the above-mentioned object, a packet transmission device according to one aspect of the present invention comprises: a predetermined number of first conversion means provided common to a plurality of channels; a distribution means extracting, when packet data is inputted through a single arbitrary channel, some of the first conversion means by a number corresponding to a ratio between an output transmission rate of the first conversion means and an input transmission rate of the packet data, and sequentially and cyclically distributing the packet data to the first conversion means extracted; and a multiplex means multiplexing predetermined length user data outputted from each of the first conversion means into a single channel to be outputted; wherein each of the first conversion means divides the packet data distributed by the distribution means into the user data to be outputted.

Namely, the first conversion means have only to be provided, common to a plurality of channels, for at least more than the number corresponding to a ratio between the output transmission rate of the first conversion means itself and the input transmission rate of the packet data, so that it is not necessary to provide the first conversion means per channel like the low speed user data-conversion card or the high speed user data-conversion card described referring to the above-mentioned prior art example.

The distribution means extracts, when the packet data is inputted through a single arbitrary channel, some of the first conversion means by the number corresponding to the ratio between the output transmission rate of the first conversion means and the input transmission rate of the packet data, and sequentially and cyclically distributes the packet data to the first conversion means extracted. Thus, the packet data is provided to each of the first conversion means at a transmission rate respectively suited for a processing performance of the first conversion means itself regardless of the input transmission rate of the packet data.

Accordingly, each of the first conversion means respectively and independently divides the packet data distributed into predetermined length user data, thereby enabling the user data to be outputted without an occurrence of a transmission delay.

Also, since the user data is outputted in parallel from each of the first conversion means, the multiplex means multiplexes the user data outputted from each of the first conversion means into a single channel to be outputted.

Thus, in the packet transmission device according to one aspect of the present invention, the first conversion means has only to achieve a processing performance of the low speed user data-conversion card, so that it is possible to improve the transmission rate of a packet without using the high speed user data-conversion card.

[2] Also, in the above-mentioned [1], the distribution means may extract some of the first conversion means by the number corresponding to the ratio in ascending order of a used resource amount of the first conversion means, and perform the distribution when a remaining resource amount of the first conversion means extracted is larger than a transmission amount designated in the packet data.

[3] Also, in the above-mentioned [1], the distribution means may extract some of the first conversion means by the number corresponding to the ratio in ascending order of a used resource amount of the first conversion means, and perform the distribution only when a sum of remaining resource amounts of the first conversion means extracted is larger than a transmission amount designated in the packet data and each of remaining amounts of the first conversion means extracted is larger than a value obtained by dividing the transmission amount by the number corresponding to the ratio.

In the case of the above-mentioned [2] or [3], since the packet data can be appropriately distributed preferentially to the first conversion means whose used resource amount is less (remaining resource amount is larger), it is possible to effectively use the resources of the first conversion means.

[4] Also, in the above-mentioned [1], the first conversion means may include means adding, every time the distributed packet data is divided into the user data, an identifier of the means itself to each of the user data.

Namely, since the user data is outputted in parallel and asynchronously from each of the first conversion means, the user data multiplexed by the multiplex means may not be outputted in accordance with an inputted order of the packet data. Therefore, each of the first conversion means adds an identifier of the first conversion means itself to the user data divided, to be outputted.

Thus, a receiving side (e.g. mobile equipment) of the user data sorts the user data received in accordance with the identifier, thereby easily assembling the original packet data.

[5] Also, in the above-mentioned [1], the multiplex means may convert the user data outputted from each of the first conversion means into a frame of HSDPA (High Speed Downlink Packet Access) system.

Thus, it is possible to provide a packet transmission device easily accepting the introduction of the HSDPA system without replacing a user data-conversion card with a high speed user data-conversion card.

[6] Also, in the above-mentioned [1], the packet transmission device may further comprise at least a single second conversion means provided common to the plurality of channels dividing the packet data into the user data and outputting the user data at a transmission rate more than the input transmission rate of the packet data, wherein the distribution means may preferentially provide the packet data to the second conversion means and, upon detecting that a remaining resource amount of the second conversion means is insufficient for the transmission amount, switch from the second conversion means to the first conversion means to distribute the packet data.

Namely, when the first conversion means has a low processing performance like the low speed user data-conversion card described referring to the above-mentioned prior art example, at least one second conversion means which has a high processing performance like the high speed user data-conversion card described referring to the above-mentioned prior art example has only to be provided common to the channels, so that it is not necessary to provide the second conversion means per channel like the above-mentioned prior art example.

While preferentially providing the packet data to the second conversion means, the distribution means switches, upon detecting that the remaining resource amount of the second conversion means is insufficient for the transmission amount, from the second conversion means to the first conversion means to distribute the packet data.

Thus, it is possible to improve the transmission rate of the packet without adding the user data-conversion card more than necessary.

[7] Also, the present invention provides a control method of a packet transmission device comprising: a distribution step of extracting, when packet data is inputted through a single arbitrary channel among a plurality of channels, from among a predetermined number of first conversion cards which are provided common to the channels and respectively divide the packet data into predetermined length user data to be outputted, some of the first conversion cards by a number corresponding to a ratio between an output transmission rate of the first conversion card and an input transmission rate of the packet data, and of sequentially and cyclically distributing the packet data to the first conversion cards extracted; and a multiplex step of multiplexing the user data outputted from each of the first conversion cards into a single channel to be outputted.

In this control method of the packet transmission device, as described in the above-mentioned [1], it is possible to improve the transmission rate of the packet without using the high speed user data-conversion card.

[8] Also, in the above-mentioned [7], the distribution step may comprise extracting some of the first conversion cards by the number corresponding to the ratio in ascending order of a used resource amount of the first conversion card, and performing the distribution when a remaining resource amount of the first conversion cards extracted is larger than a transmission amount designated in the packet data.

[9] Also, in the above-mentioned [7], the distribution step may comprise extracting some of the first conversion cards by the number corresponding to the ratio in ascending order of a used resource amount of the first conversion card, and performing the distribution only when a sum of remaining resource amounts of the first conversion cards extracted is larger than a transmission amount designated in the packet data and each of remaining amounts of the first conversion cards extracted is larger than a value obtained by dividing the transmission amount by the number corresponding to the ratio.

In the control method of the packet transmission device of the above-mentioned [8] or [9], as described in the above-mentioned [2] or [3], it is possible to effectively use resources of the first conversion cards.

[10] Also, in the above-mentioned [7], the multiplex step may comprise converting the user data outputted from each of the first conversion cards into a frame of HSDPA (High Speed Downlink Packet Access) system.

In this control method of the packet transmission device, as described in the above-mentioned [5], it is possible to easily accept the introduction of the HSDPA system without replacing the user data-conversion card with the high speed user data-conversion card.

[11] Also, in the above-mentioned [7], the distribution step may comprise preferentially providing the packet data to at least a single second conversion cards which are provided common to the plurality of channels, divide the packet data into the user data, and output the user data at a transmission rate more than the input transmission rate of the packet data and, upon detecting that a remaining resource amount of the second conversion cards is insufficient for the transmission amount, switching from the second conversion cards to the first conversion cards to distribute the packet data.

In this control method of the packet transmission device, as described in the above-mentioned [6], it is possible to improve the transmission rate of the packet without adding the user data-conversion card more than necessary.

According to the present invention, it is possible to improve the transmission rate of the packet without adding the high speed user data-conversion card, thereby enabling development costs to be reduced and existing resources to be effectively used.

Also, it is made possible to easily accept the introduction of the HSDPA system, enabling a development term to be shortened and services to be early started.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 5A-5C are diagrams showing an operation example of a packet data distribution controller used for an embodiment [1] of the present invention;

DESCRIPTION OF THE EMBODIMENTS

Figure 1:
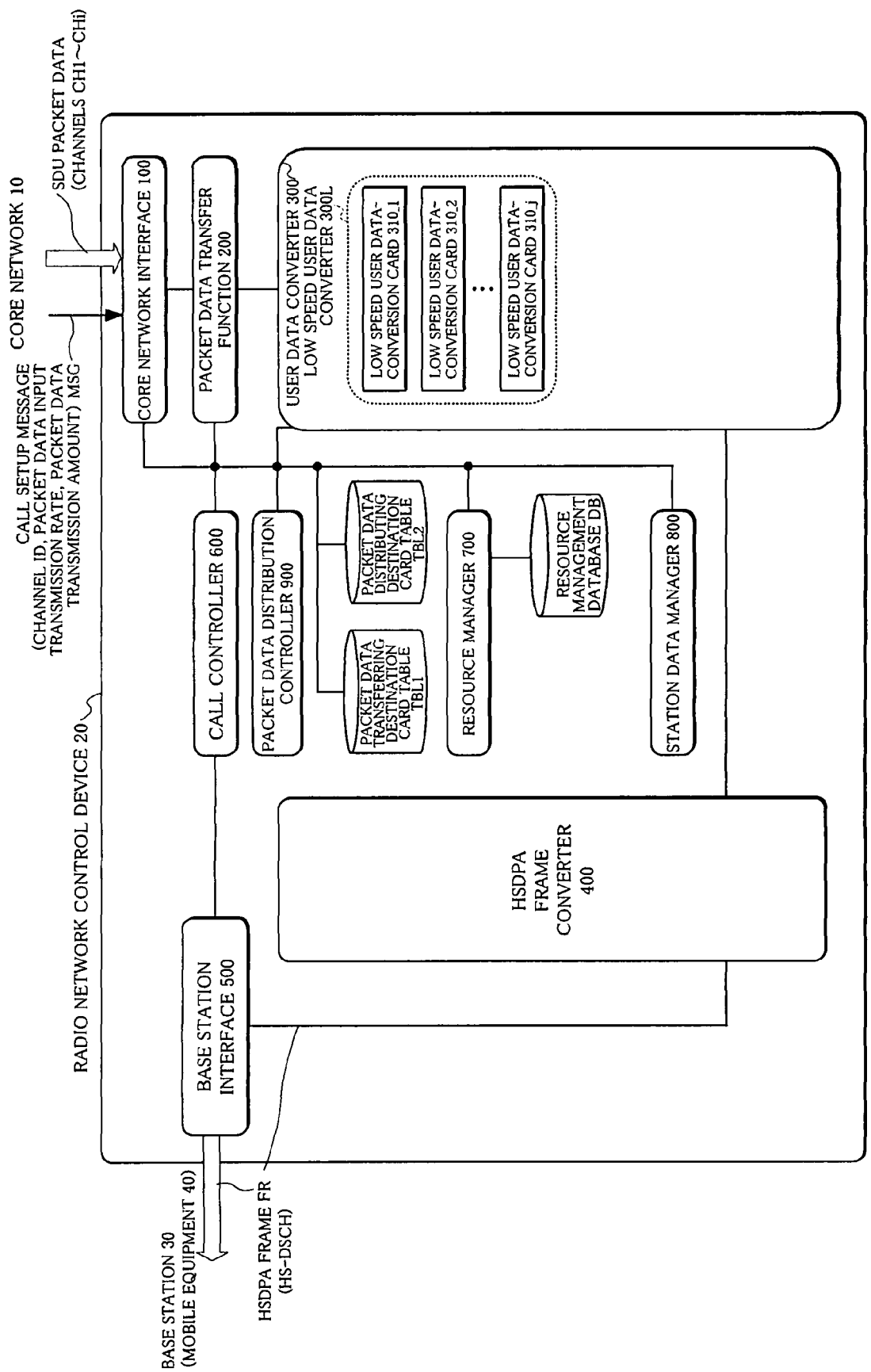
FIG. 1 is a block diagram showing an embodiment [1] of a packet transmission device and control method thereof according to the present invention.
Figure 2:
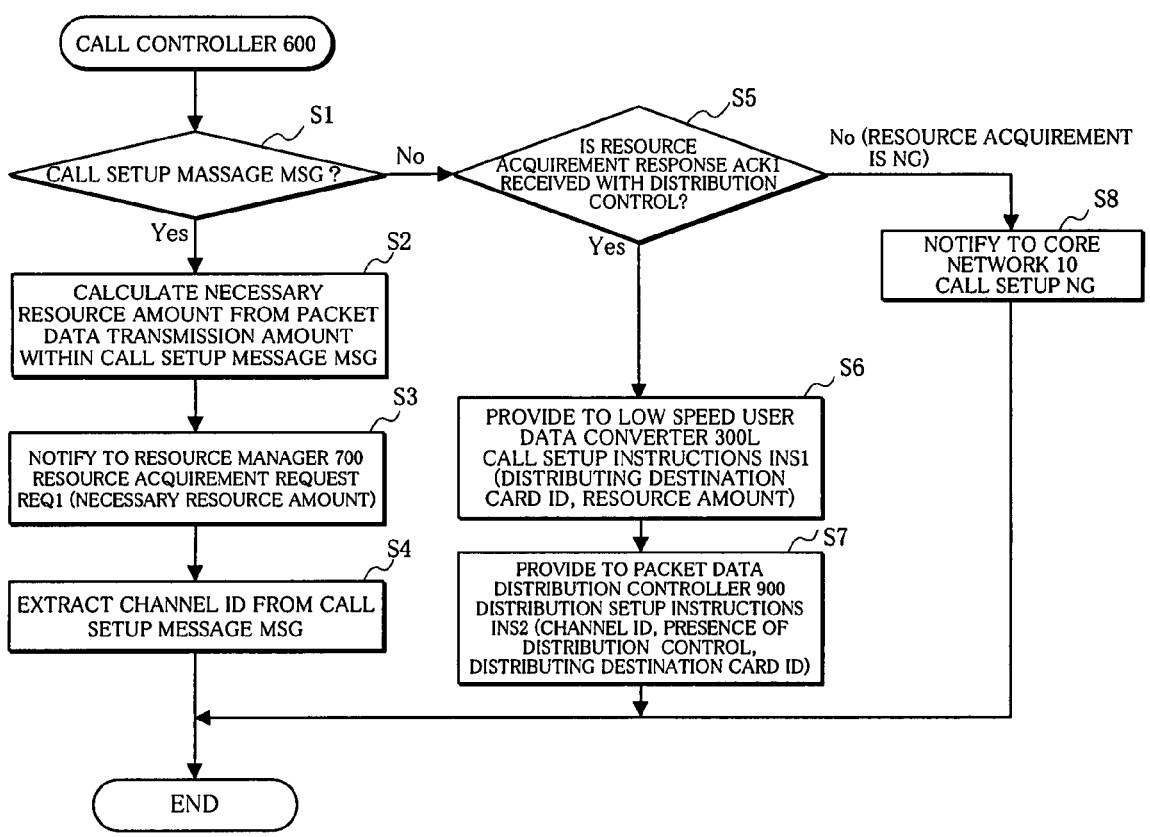
FIG. 2 is a flowchart showing an operation example of a call controller used for an embodiment [1] of the present invention.
Figures 3A, 3B:
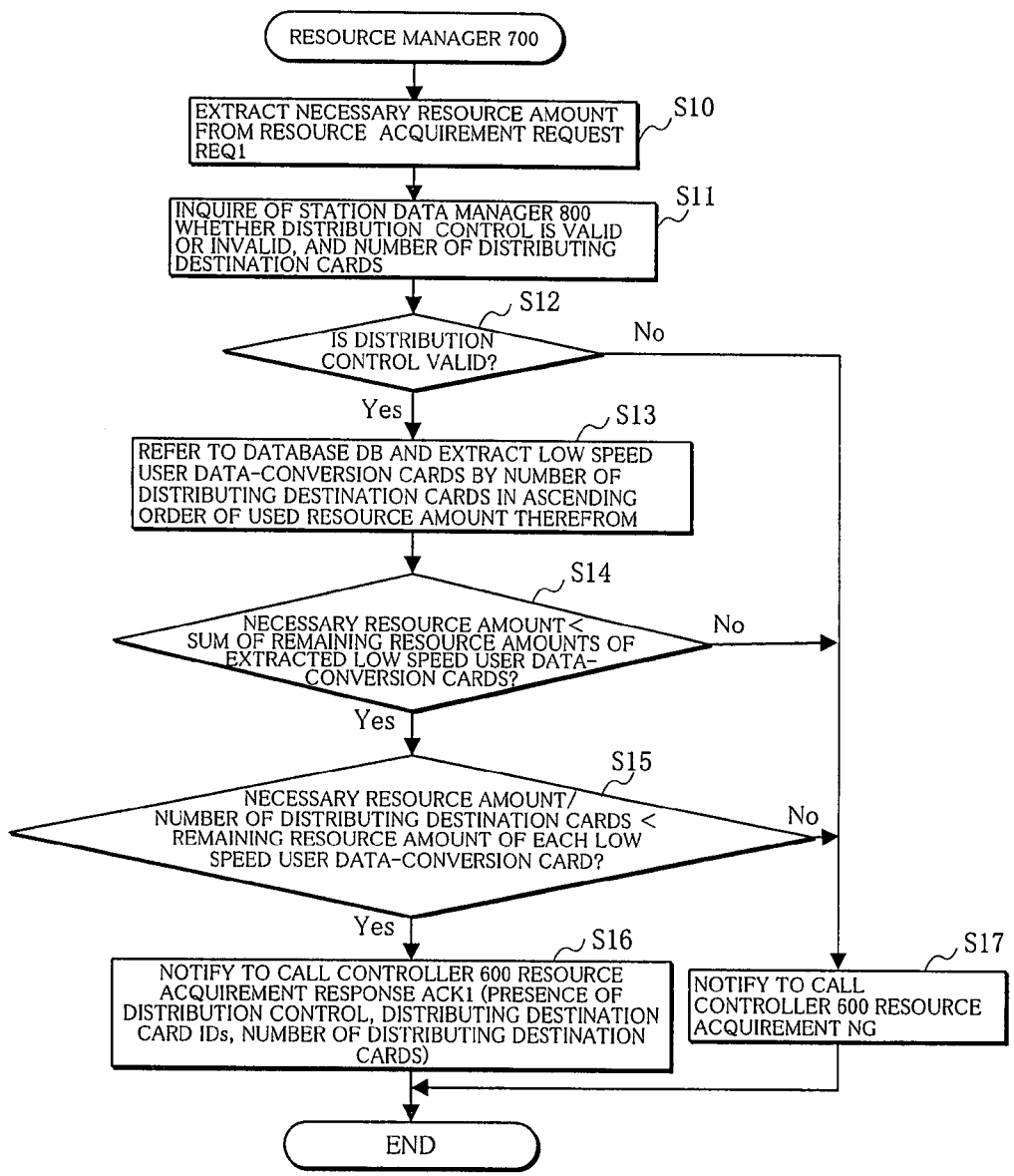
FIGS. 3A and 3B are diagrams showing an operation example of a resource manager used for an embodiment [1] of the present invention.
Figure 4:
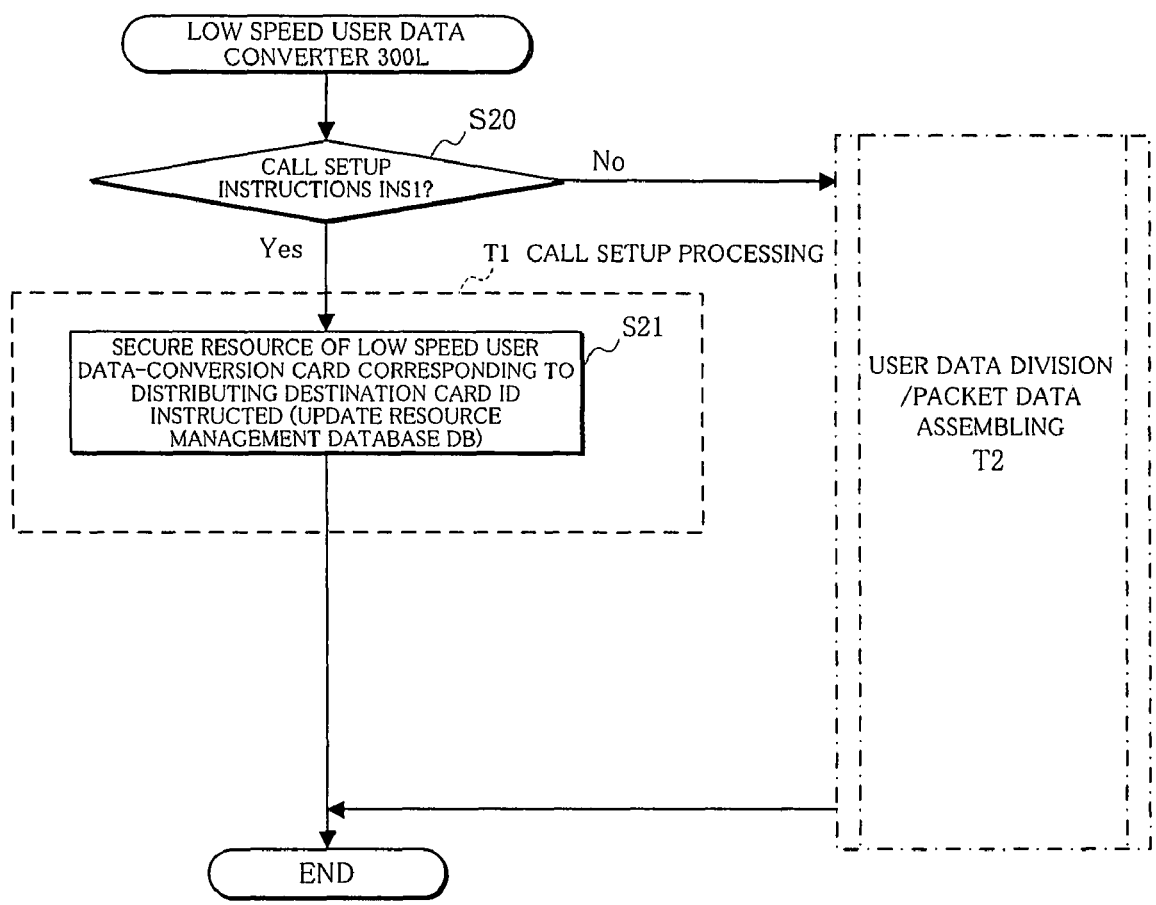
FIG. 4 is a flowchart showing an operation example (1) of a low speed user data converter used for a packet transmission device and control method thereof according to the present invention.
Figure 7:
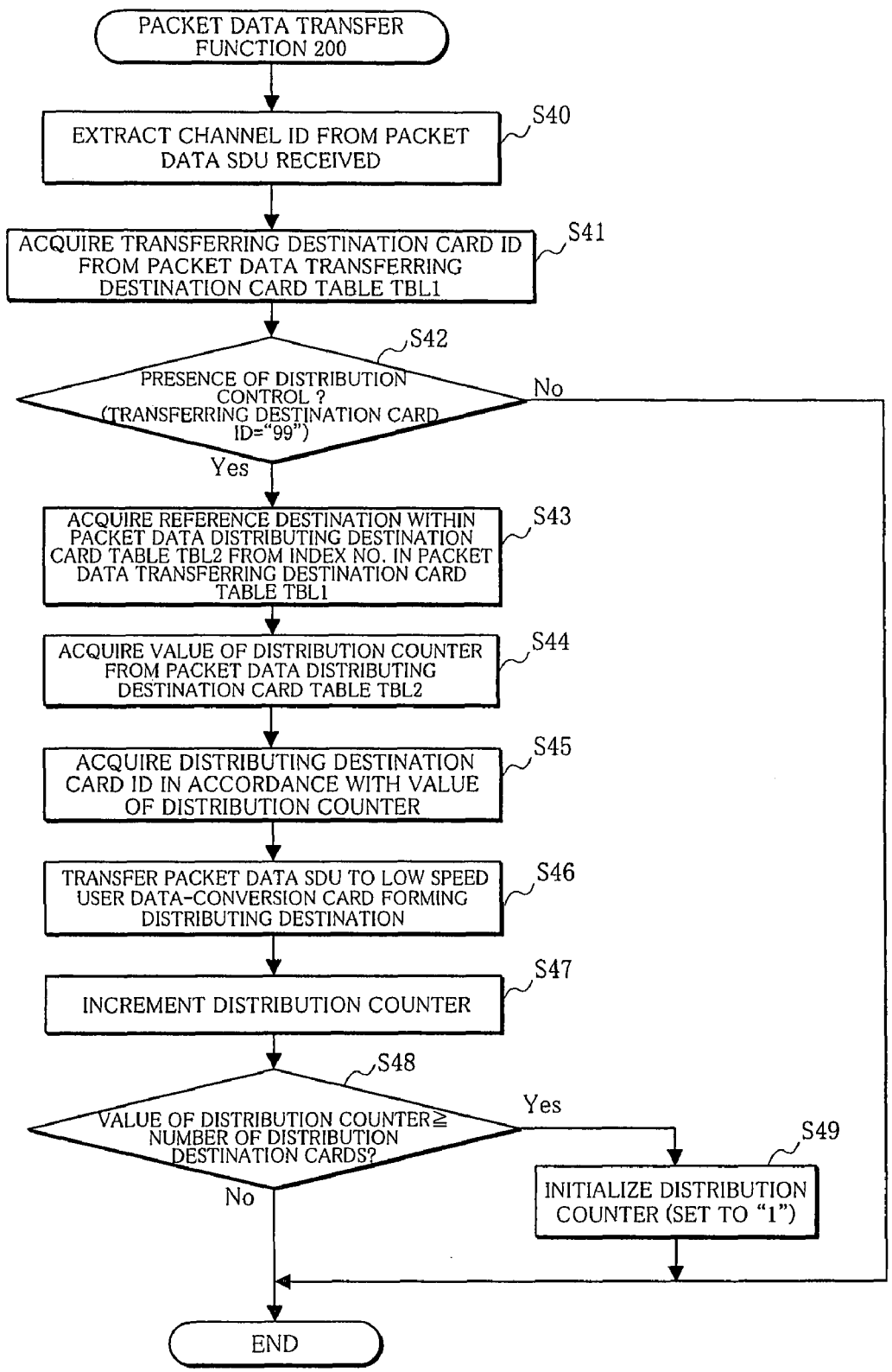
FIG. 7 is a flowchart showing an operation example of a packet data transfer function used for an embodiment [1] of the present invention.
Figures 8A, 8B:
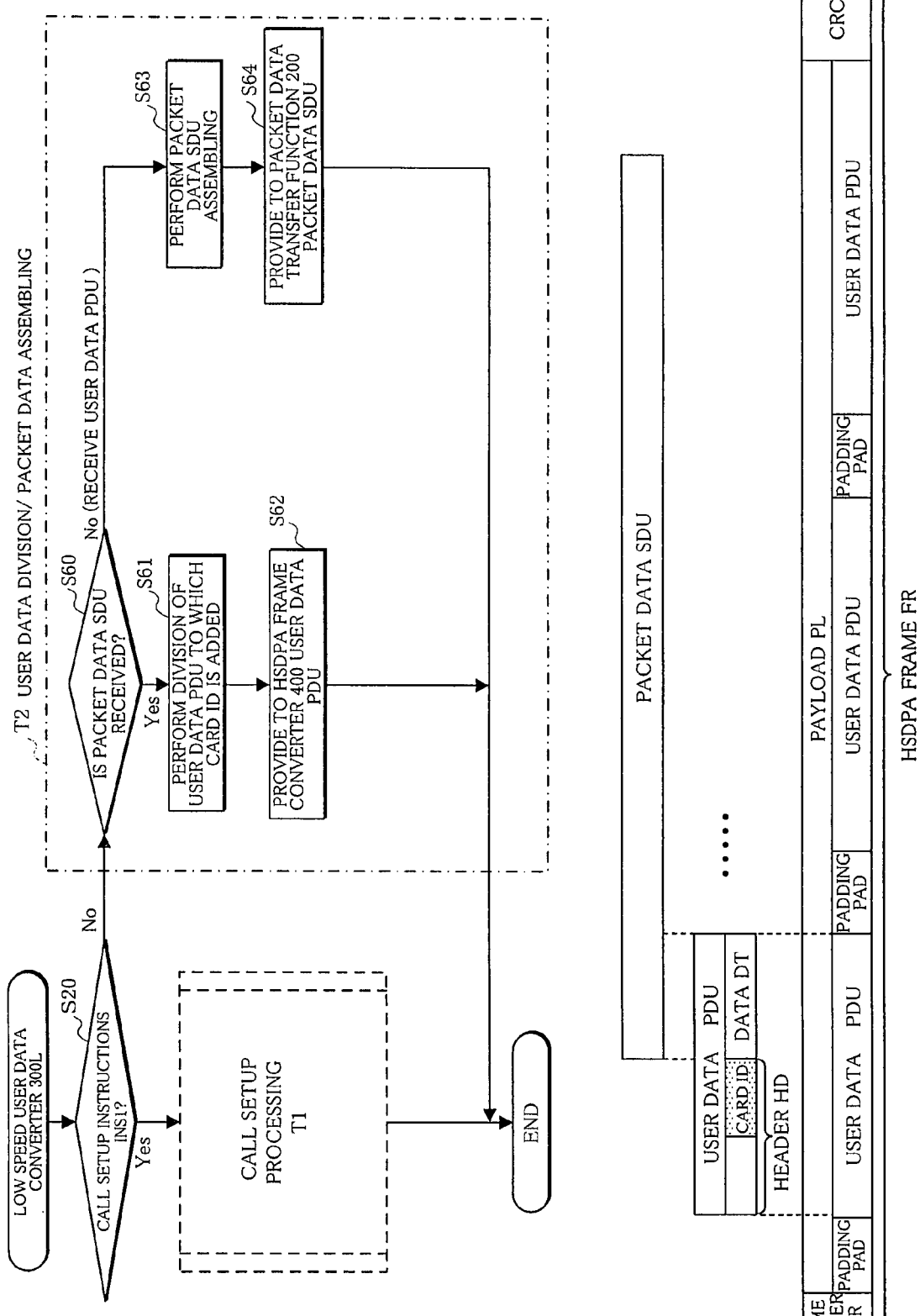
FIGS. 8A and 8B are diagrams showing an operation example (2) of a low speed user data converter used for a packet transmission device and control method thereof according to the present invention.
Figure 9:
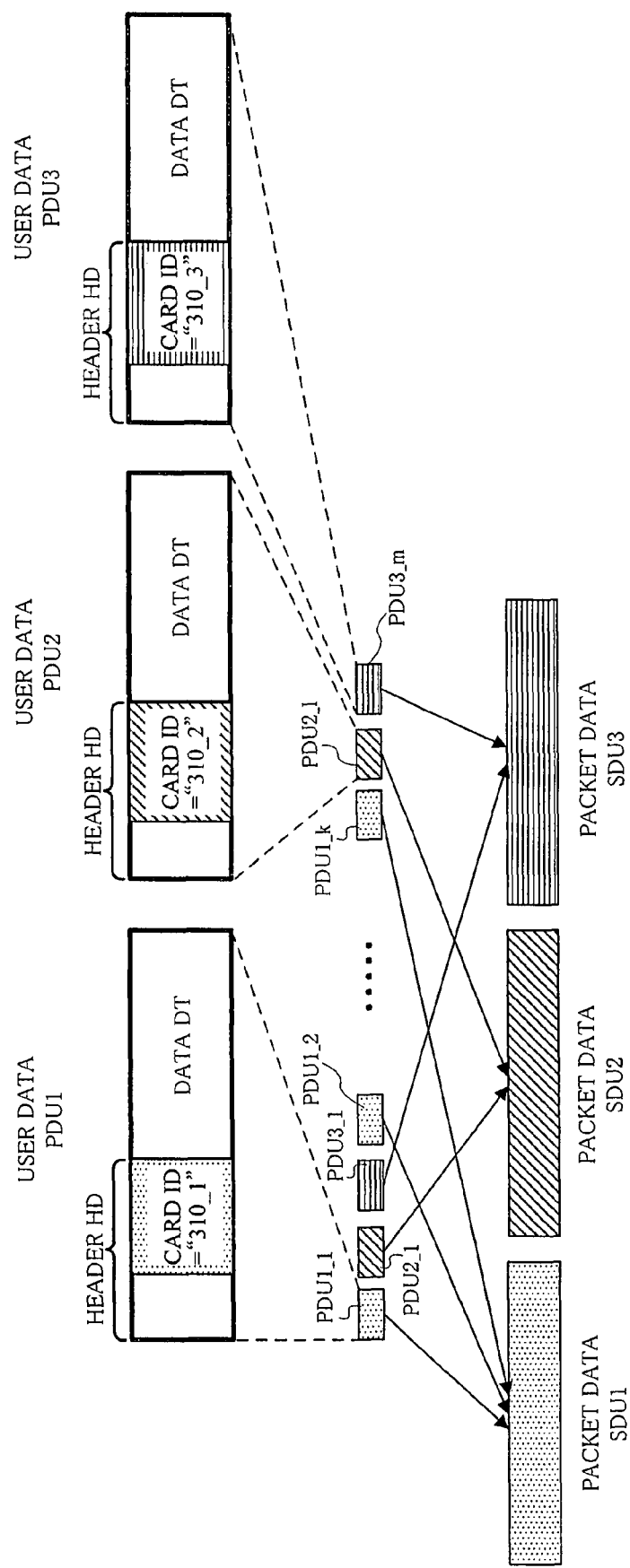
FIG. 9 is a block diagram showing a packet data assembling operation example of a mobile equipment.

Embodiments [1] and [2] of the packet transmission device and the control method thereof according to the present invention will now be described referring to FIGS. 1, 2, 3A, 3B, 4, 5A-5C, 6, 7, 8A, 8B, 9-11, 12A-12C, 13A-13C, 14, and 15 in the following order:

I. Embodiment [1]: FIGS. 1, 2, 3A, 3B, 4, 5A-5C, 6, 7, 8A, 8B, and 9
  I.1. Arrangement: FIG. 1
  I.2. Operation example: FIGS. 2, 3A, 3B, 4, 5A-5C, 6, 7, 8A, 8B, and 9
    I.2.1. Packet data distributing destination setting example: FIGS. 2, 3A, 3B, 4, and 5A-5C
      I.2.1.1. Operation example [1] of call controller 600: FIG. 2
      I.2.1.2. Operation example [1] of resource manager 700: FIGS. 3A and 3B
      I.2.1.3. Operation example (1) of low speed user data converter 300L (call setup processing): FIG. 4
      I.2.1.4. Operation example [1] of packet data distribution controller 900: FIGS. 5A-5C
    I.2.2. Packet data distribution example: FIGS. 6, 7, 8A, 8B, and 9
      I.2.2.1. Data/frame flow example [1]: FIGS. 5A-5C, and 6
      I.2.2.2. Operation Example [1] of packet data transfer function 200: FIG. 7
      I.2.2.3. Operation example (2) of low speed user data converter 300L (user data division/packet data assembling): FIGS. 8A and 8B
      I.2.2.4. Packet data assembling operation example of mobile equipment: FIG. 9

Figure 10:
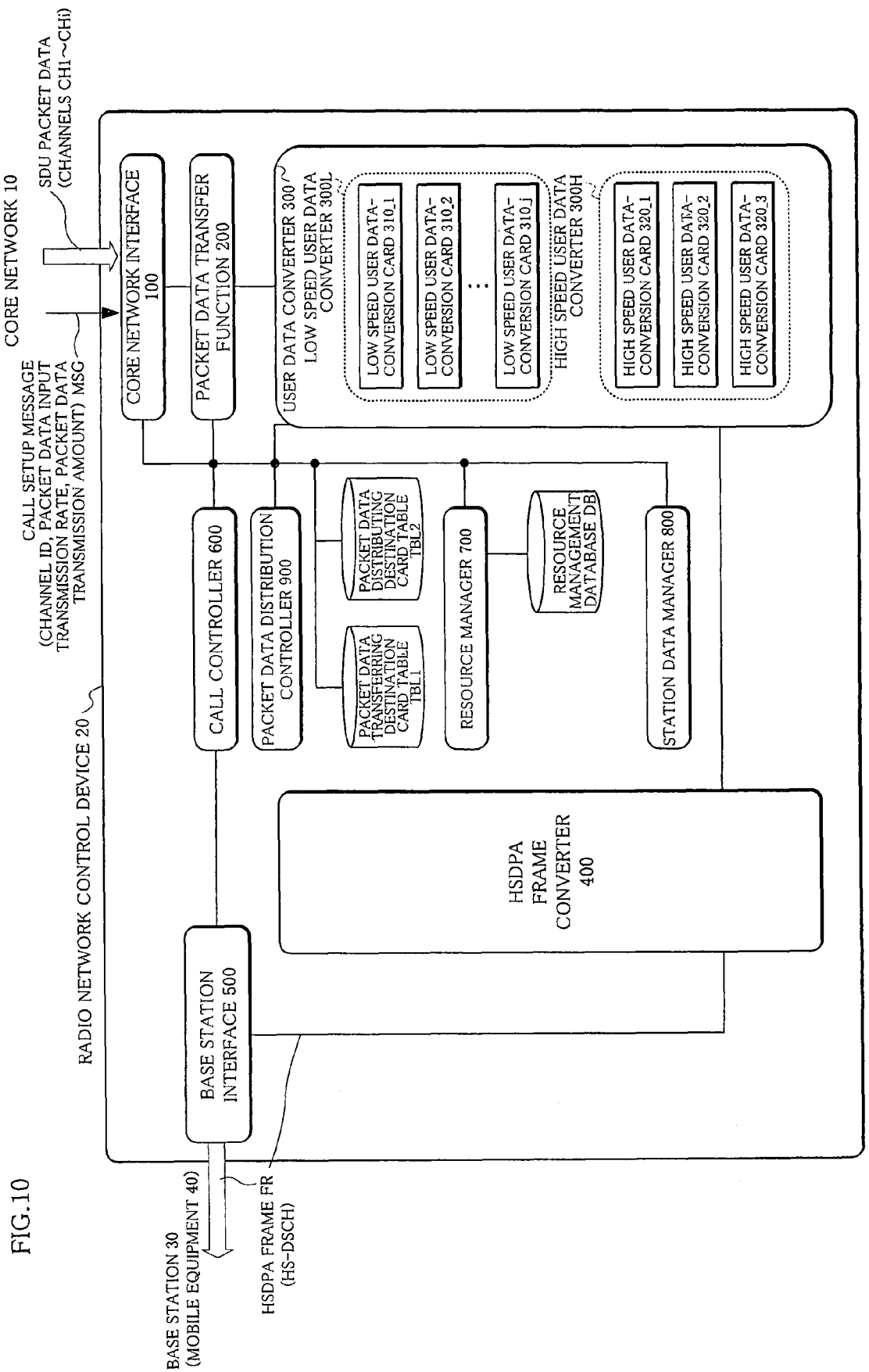
FIG. 10 is a block diagram showing an embodiment [2] of a packet transmission device and control method thereof according to the present invention.
Figure 11:
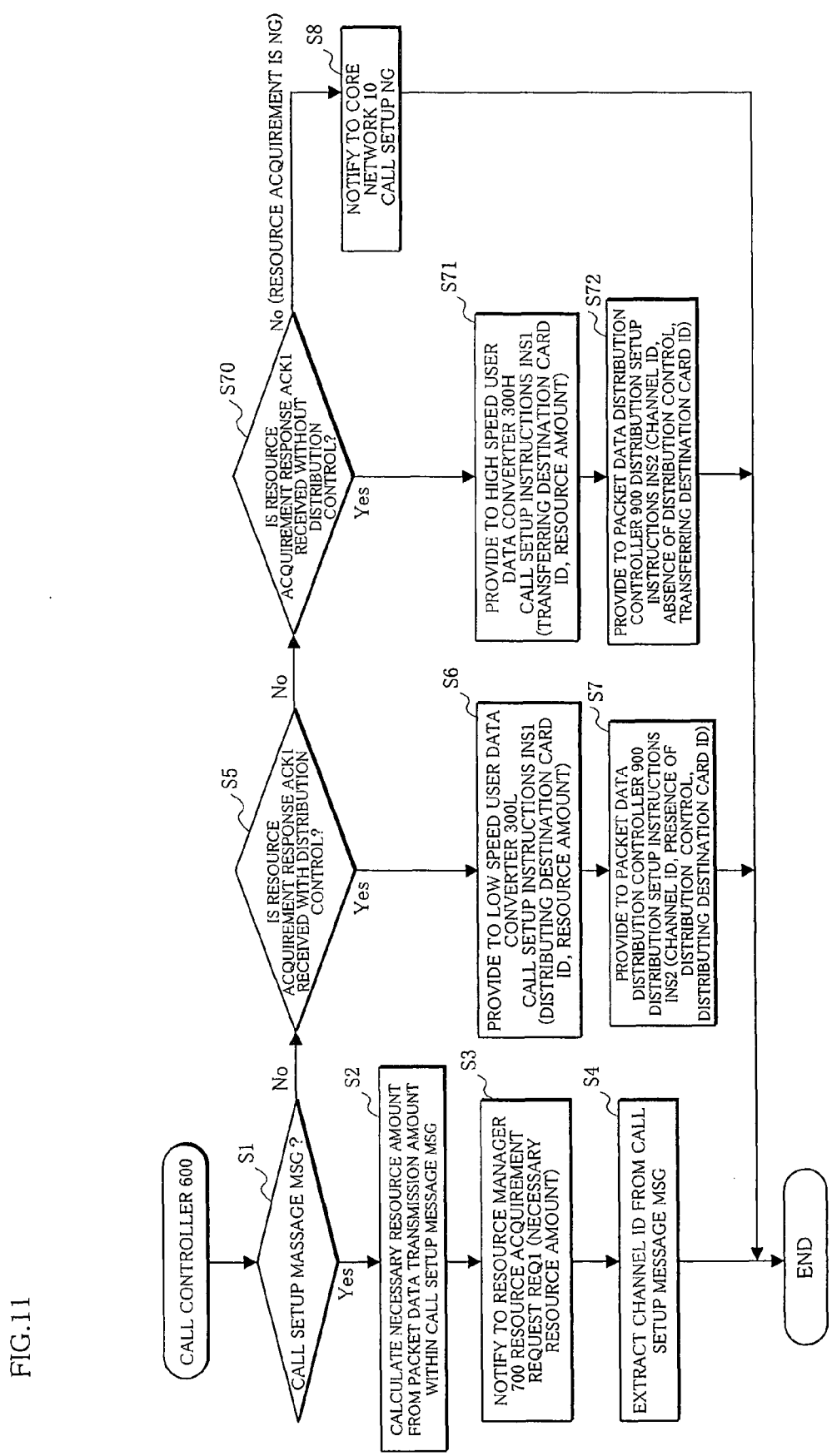
FIG. 11 is a flowchart showing an operation example of a call controller used for an embodiment [2] of the present invention.
Figures 12A, 12B, 12C:
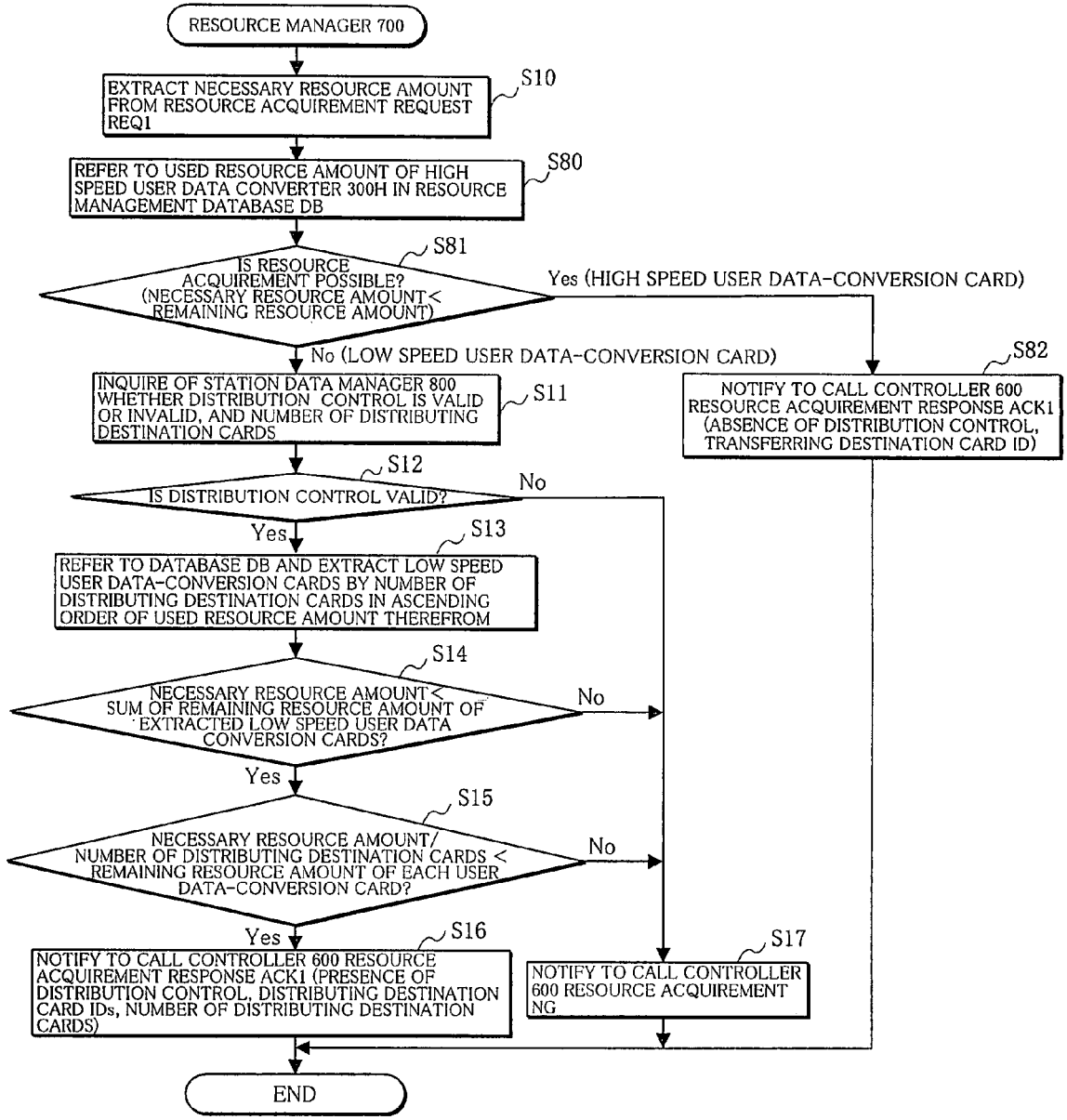
FIGS. 12A-12C are diagrams showing an operation example of a resource manager used for an embodiment [2] of the present invention.
Figures 13A, 13B, 13C:
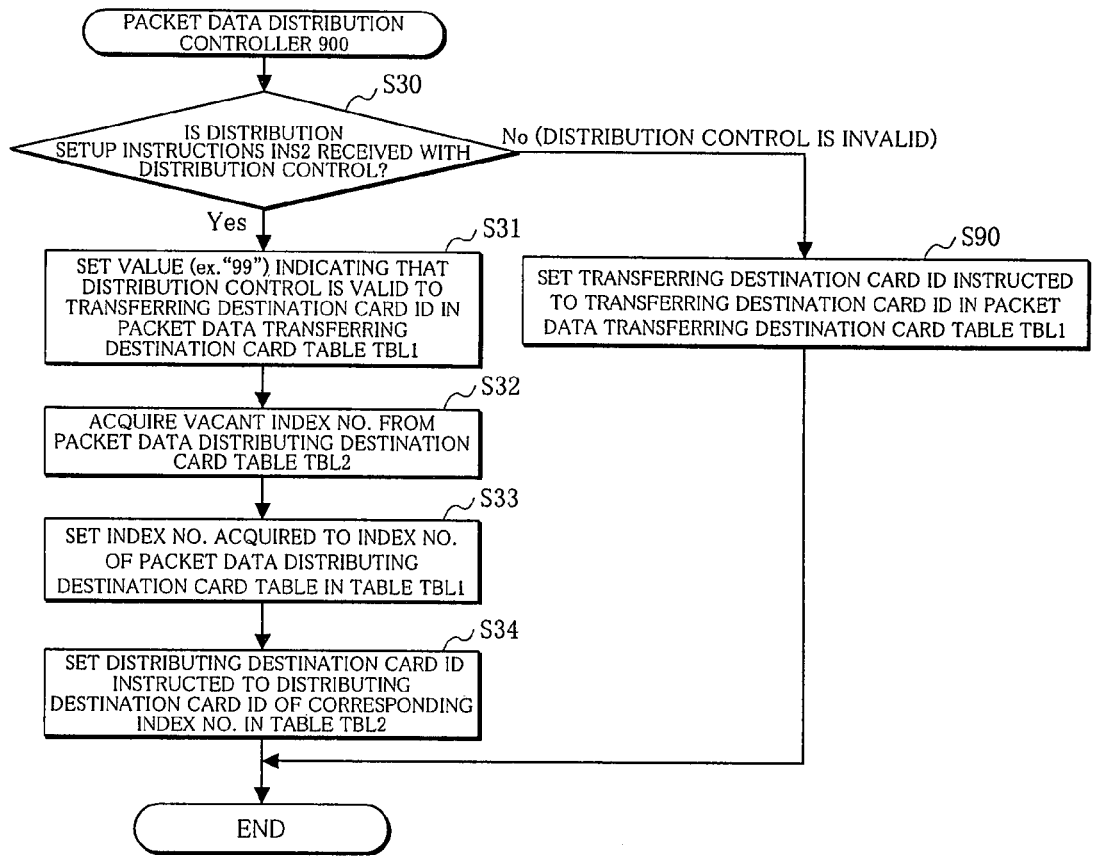
FIGS. 13A-13C are diagrams showing an operation example of a packet data distribution controller used for an embodiment [2] of the present invention.
Figure 14:
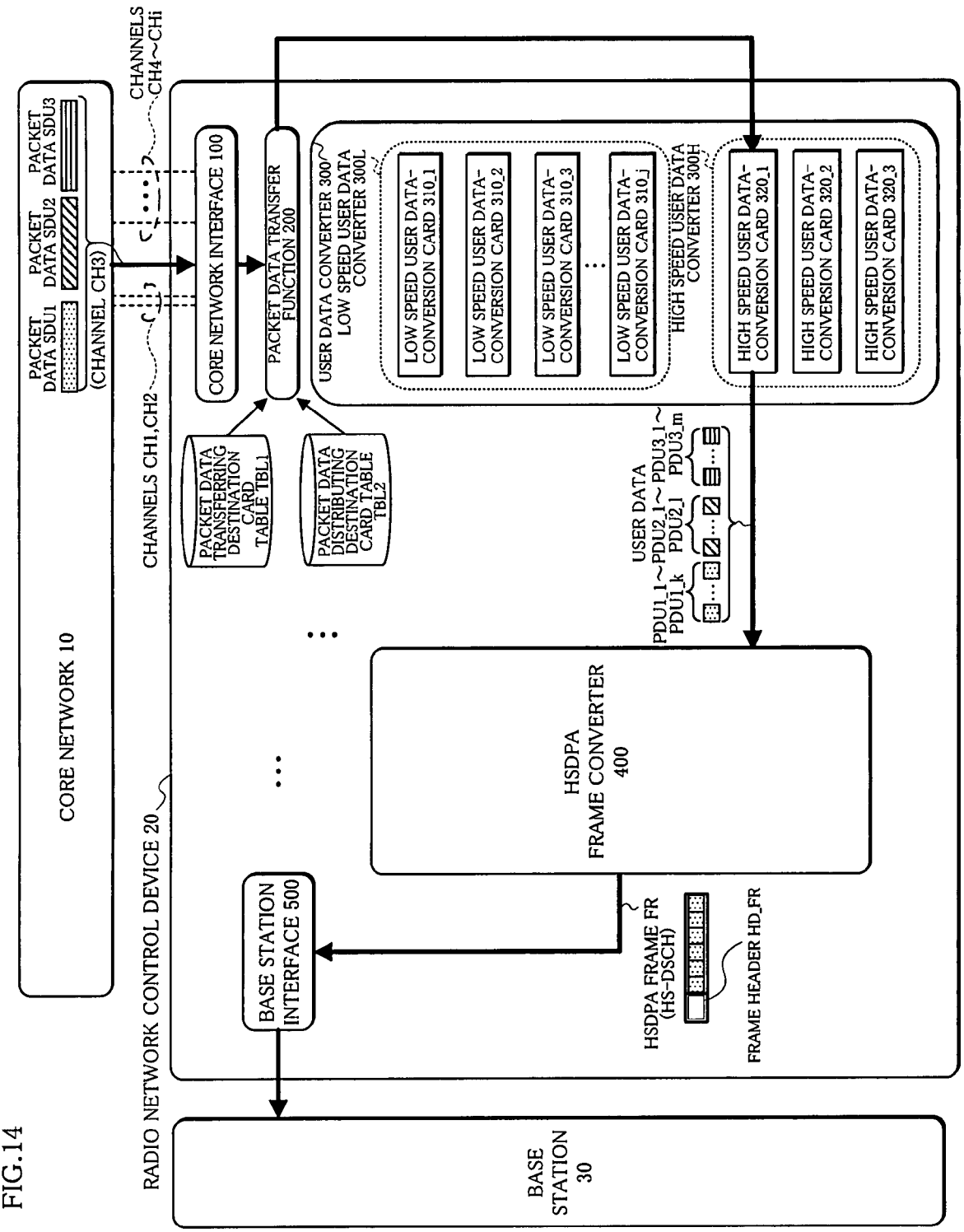
FIG. 14 is a block diagram showing a data/frame flow of an embodiment [2] of the present invention.
Figure 15:
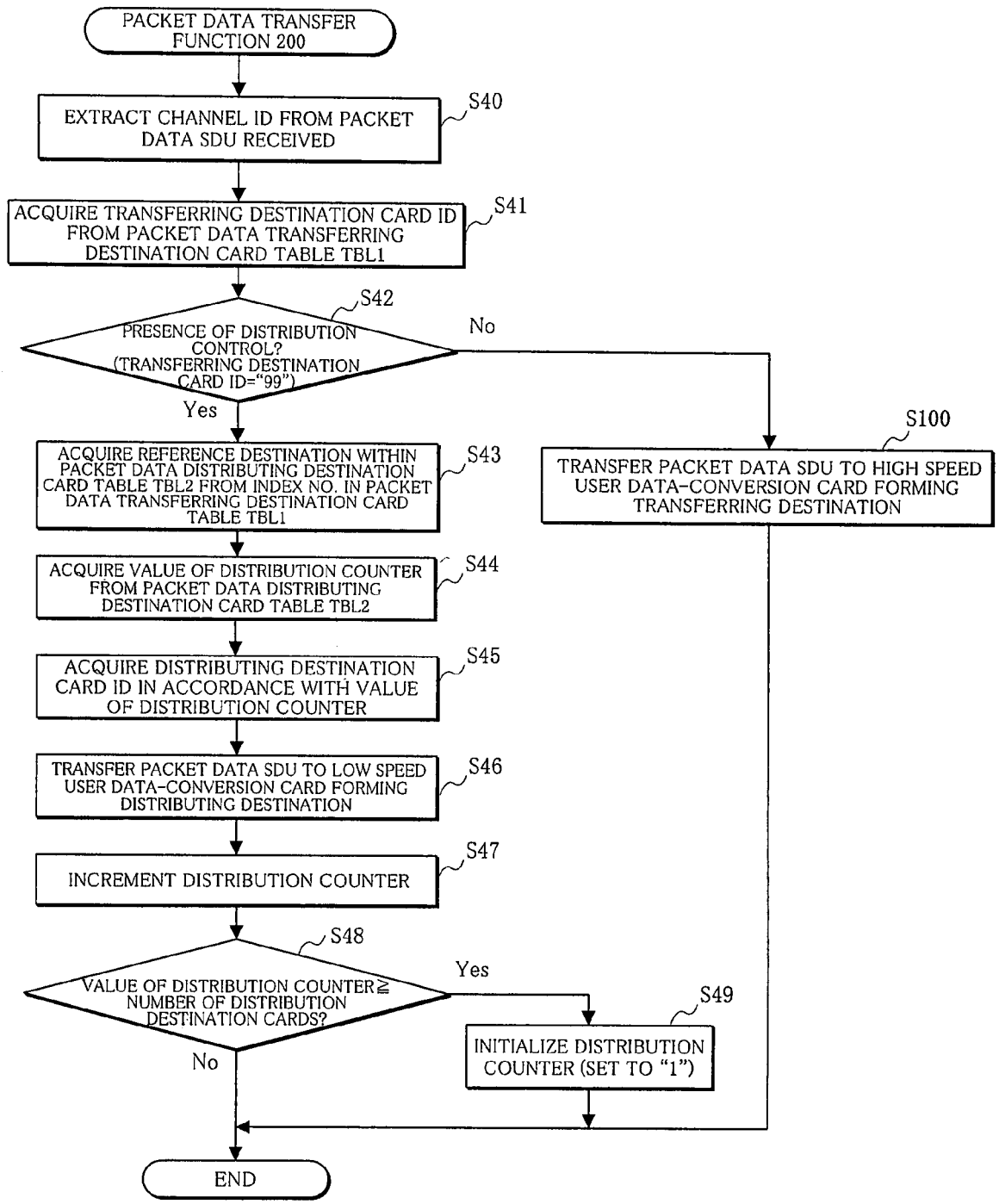
FIG. 15 is a flowchart showing an operation example of a packet data transfer function used for an embodiment [2] of the present invention.
Figure 16:
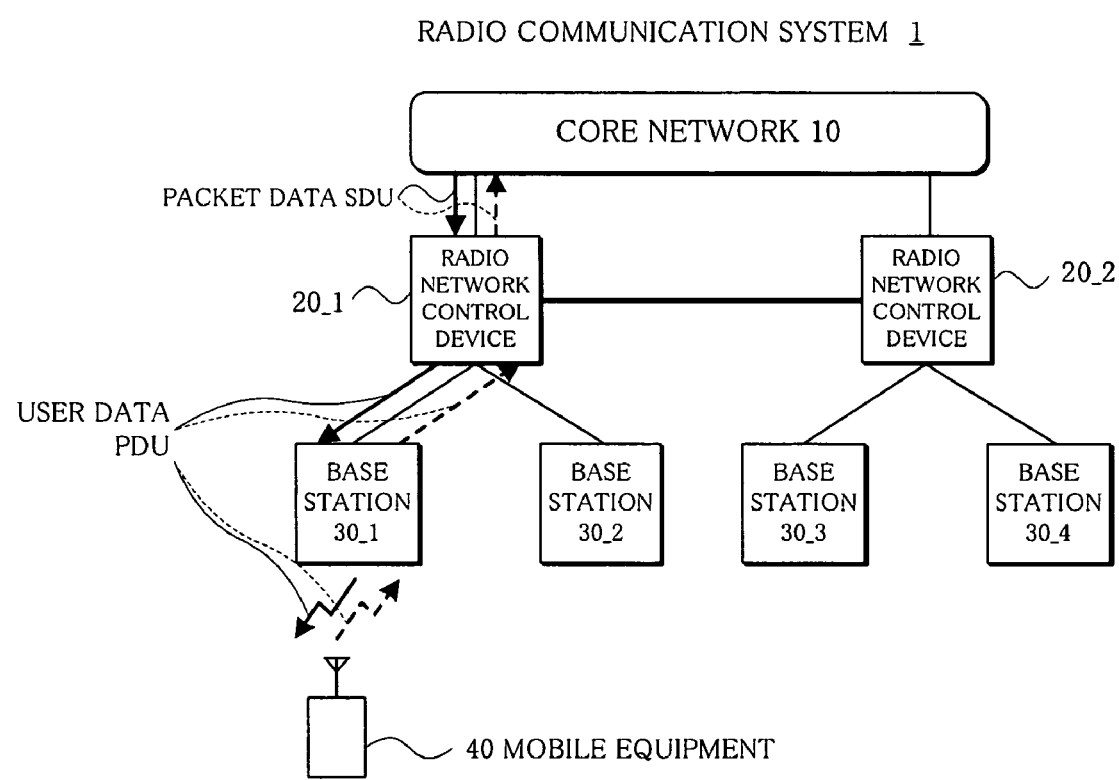
FIG. 16 is a block diagram showing an arrangement of a prior art radio communication system.
Figure 17:
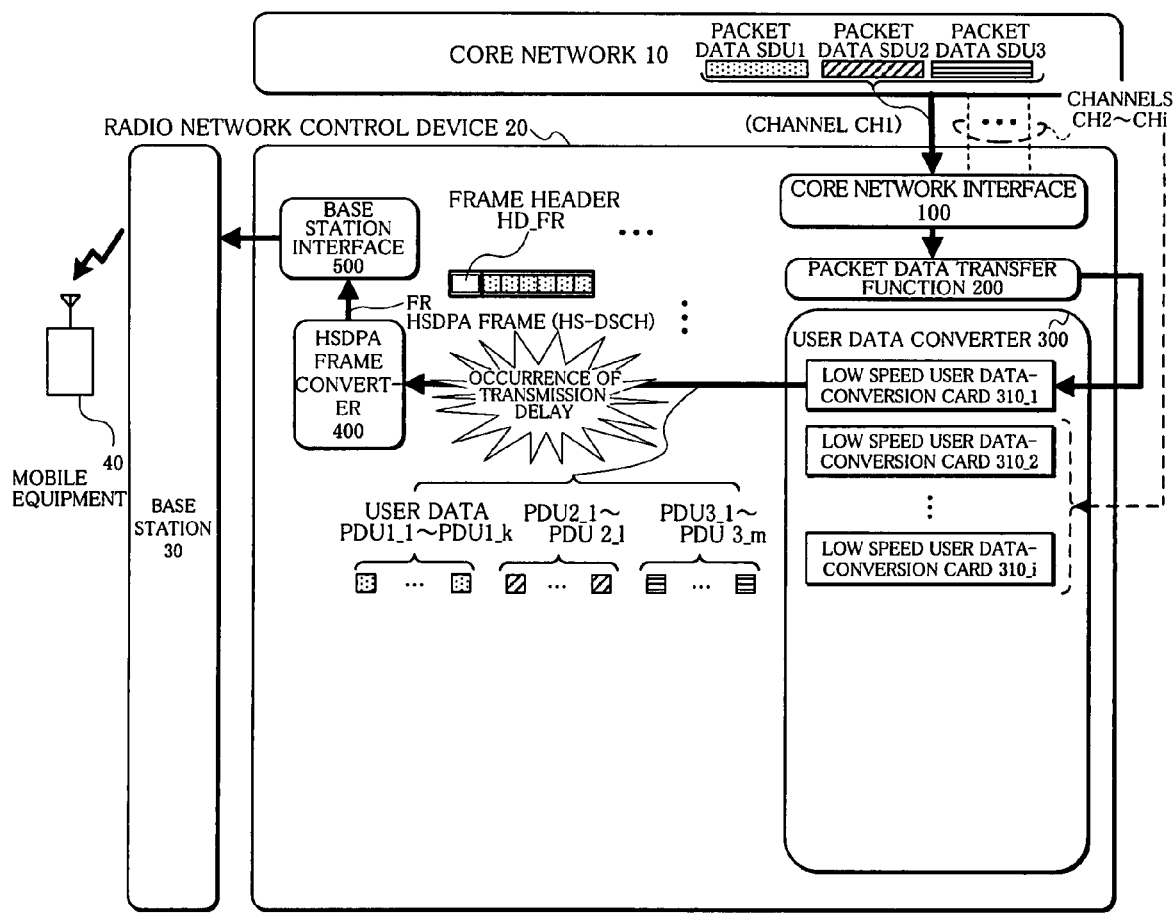
FIG. 17 is a block diagram showing a prior art example [1] of a packet transmission technology.
Figure 18:
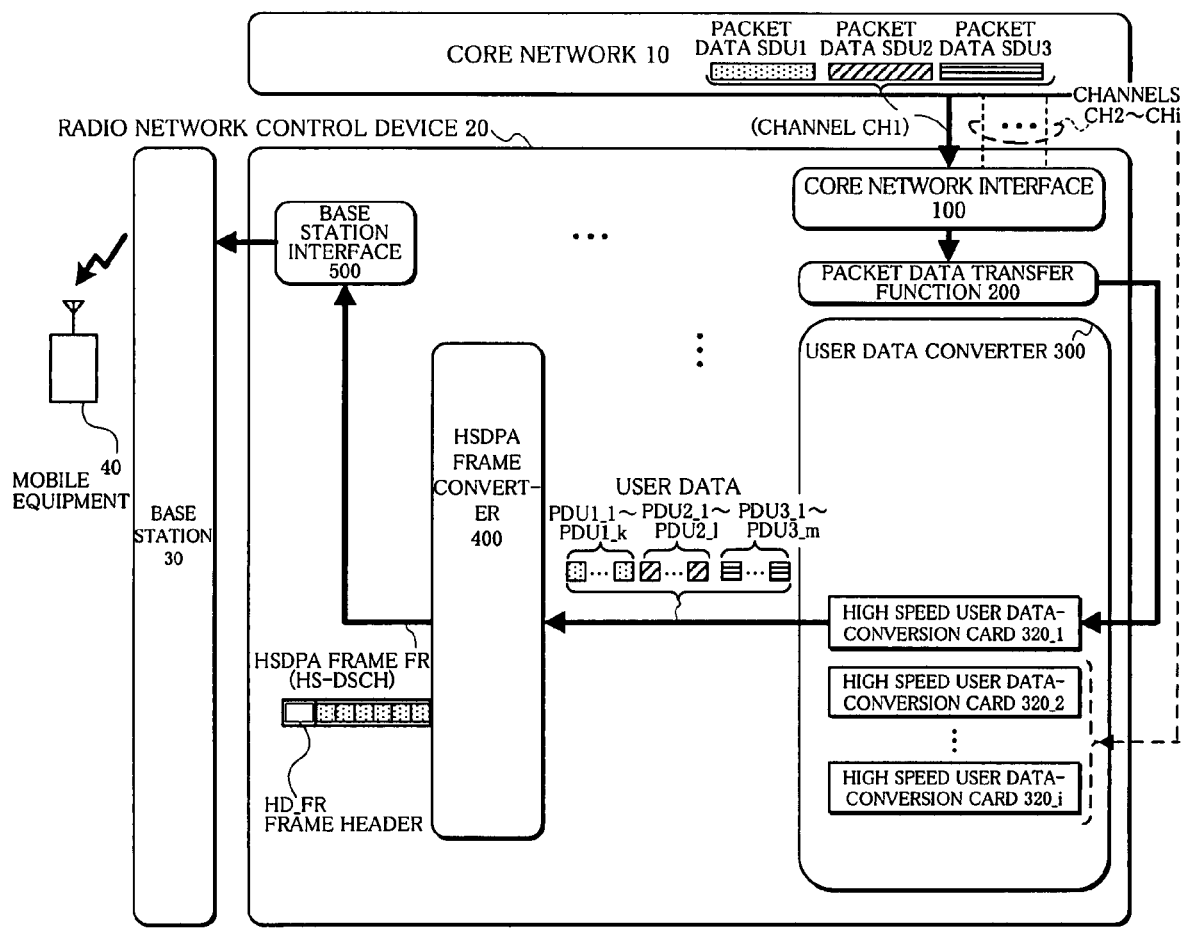
FIG. 18 is a block diagram showing a prior art example [2] of a packet transmission technology.

II. Embodiment [2]: FIGS. 10, 11, 12A-12C, 13A-13C, 14, and 15
  II.1. Arrangement: FIG. 10
  II.2. Operation example: FIGS. 11, 12A-12C, 13A-13C, 14, and 15
    II.2.1. Packet data distributing destination setting example: FIGS. 11, 12A-12C, and 13A-13C
      II.2.1.1. Operation example [2] of call controller 600: FIG. 11
      II.2.1.2. Operation example [2] of resource manager 700 (preference for high speed user data-conversion card): FIGS. 12A-12C
      II.2.1.3. Operation example [2] of packet data distribution controller 900: FIGS. 13A-13C
    II.2.2. Packet data distribution example: FIGS. 14 and 15
      II.2.2.1. Data/frame flow example [2]: FIG. 14
      II.2.2.2. Operation example [2] of packet data transfer function 200: FIG. 15

I. Embodiment [1]

FIGS. 1, 2, 3A, 3B, 4, 5A-5C, 6, 7, 8A, 8B, and 9

I.1. Arrangement: FIG. 1

A radio network control device 20 shown in FIG. 1 realizes the packet transmission device and the control method thereof according to the present invention, which is composed of, in the same way as the prior art arrangement, the core network interface 100 connected to the core network 10 through "i" units of channels CH1-CHi, the packet data transfer function 200 transferring the packet data SDU received through the core network 100 to the inside of the device 20 itself, the user data converter 300 dividing the packet data SDU transferred from the packet data transfer function 200 into the predetermine length user data PDU to be outputted, the HSDPA frame converter 400 converting the user data PDU outputted from the user data converter 300 into the HSDPA frame FR to be outputted by using the HS-DSCH, and the base station interface 500 transmitting the HSDPA frame FR outputted from the HSDPA frame converter 400 to the mobile equipment 40 through the base station 30.

Also, in a low speed user data converter 300L within the user data converter 300, a predetermined number of "j" units of low speed user data-conversion cards 310_1-310_j are provided common to channels CH1-CHi different from the prior art arrangement.

Also, the radio network control device 20 of this embodiment has, in addition to the prior art arrangement, a call controller 600 receiving a call setup message MSG through the core network interface 100, a resource manager 700 managing a used resource amount of the low speed user data converter 300L with a resource management database DB, a station data manager 800 managing the information of stations managed by the device 20 itself, a packet data distribution controller 900 setting an identifier of the low speed user data-conversion card 310 to which the packet data SDU should be distributed (hereinafter, referred to as distributing destination card) in a packet data transferring destination card table TBL1 and a packet data distributing destination card table TBL2 upon receiving instructions from the call controller 600.

In the call setup message MSG, an ID of the channel CH (hereinafter, referred to as channel ID) used for the transmission of the packet data SDU, and an input transmission rate and a transmission amount or the like of the packet data SDU are designated.

I.2. Operation Example: FIGS. 2, 3A, 3B, 4, 5A-5C, 6, 7, 8A, 8B, and 9

An operation of this embodiment will now be described. Firstly, a setting example of the distributing destination card of the packet data SDU will be described referring to FIGS. 2, 3A, 3B, 4, and 5A-5C. Then, a distribution example of the packet data SDU based on the setting will be described referring to FIGS. 6, 7, 8A, 8B, and 9.

I.2.1. Packet Data Distributing Destination Setting Example: FIGS. 2, 3A, 3B, 4, and 5A-5C

I.2.1.1. Operation Example [1] of Call Controller 600: FIG. 2

As shown in FIG. 2, when receiving the call setup message MSG from the core network 10 (at step S1), the call controller 600 calculates a resource amount necessary to make the low speed user data-conversion card 310 process the packet data SDU (hereinafter, referred to as necessary resource amount) based on the transmission amount of the packet data SDU within the call setup message MSG (at step S2).

The necessary resource amount is e.g. a capacity or the like of a memory (not shown) within the low speed user data-conversion card 310 which is necessary to temporarily store the packet data SDU inputted for the transmission amount designated by the call setup message MSG, in the low speed user data-conversion card 310.

The call controller 600 notifies to the resource manager 700 a resource acquirement request REQ1 for the necessary resource amount calculated and waits for a resource acquirement response ACK1 to the resource acquirement request REQ1 (at step S3).

Concurrently, the call controller 600 extracts the channel ID from the call setup message MSG (at step S4).

The resource acquirement response ACK1 includes, as will be described later, information indicating presence/absence of distribution control of the packet data SDU in the radio network control device 20, an ID of the low speed user data-conversion card forming a distributing destination of the packet data SDU (hereinafter, referred to as distributing destination card ID), and a resource amount which can be respectively secured in the each of the distributing destination cards.

When receiving from the resource manager 700 the resource acquirement response ACK1 which indicates "presence of distribution control" (at step S5), the call controller 600 provides to the low speed user data converter 300L call setup instructions INS1 for instructing the distributing destination card ID and the resource amount thereof which can be secured notified by the above-mentioned resource acquirement response ACK1 (at step S6). Thus, in the low speed user data converter 300L, a call setup processing as will be describer later is performed.

The call controller 600 provides to the packet data distribution controller 900 distribution setup instructions INS2 for instructing the channel ID extracted at the above-mentioned step S4, as well as the "presence of distribution control" and the distributing destination card ID notified by the above-mentioned resource acquirement response ACK1 (at step S7). Thus, in the packet data distribution controller 900, setting the packet data transferring destination card table TBL1 and the packet data distributing destination card table TBL2 as will be describer later is to be performed.

Also, at the above-mentioned step S5, when receiving a resource acquirement NG from the resource manager 700 (namely, when the transmission amount of the packet data SDU or the number of used channels CH is so large that the call setup can not be newly performed as will be described later), the call controller 600 notifies to the core network 10 a call setup NG (at step S8).

I.2.1.2. Operation Example [1] of Resource Manager 700: FIGS. 3A and 3B As shown in FIG. 3A, the resource manager 700 extracts the necessary resource amount from the resource acquirement request REQ1 having received from the call controller 600 (at step S10).

The resource manager 700 inquires of the station data manager 800 whether the distribution control is valid or invalid, and the number of the distributing destination cards in the radio network control device 20 (at step S11).

The number of the distributing destination cards is preset by e.g. a maintenance person based on a ratio between the input transmission rate of the packet data SDU and a processing performance of the low speed user data-conversion card 310 (namely, an output transmission rate of the user data).

For example, when the input transmission rate of the packet data SDU is the maximum transmission rate "14.4 Mbps" of the above-mentioned HSDPA system and the output transmission rate of the user data by the low speed user data-conversion card 310 is the maximum transmission rate "2 Mbps" of the above-mentioned existing packet transmission standard, the number of the distributing destination cards is set with at least "8" ($\approx$14.4 Mbps/2 Mbps).

As a result of the inquiry of the station data manager 800, when recognizing that the distribution control is valid (at step S12), the resource manager 700 retrieves the resource management database DB to extract the low speed user data-conversion cards 310 by the number of the distributing destination cards in ascending order of a used resource amount from the resource management database DB (at step S13).

The resource manager 700 determines whether or not the necessary resource amount extracted at the above-mentioned step S10 is within a sum of remaining resource amounts of the low speed user data-conversion cards 310 extracted (at step S14). When the necessary resource amount extracted is within the sum, the resource manager 700 further determines whether or not a value obtained by dividing the necessary resource amount by the number of the distributing destination cards (namely, a resource amount where each of the low speed user data-conversion cards 310 extracted evenly secures the necessary resource amount) is within each remaining resource amount of the low speed user data-conversion cards 310 (at step S15).

For example, when the resource requires a amount occupying "45%" of a resource of a single low speed user data-conversion card 310, the number of the distributing destination cards is "3", and each used resource amount of the low speed user data-conversion cards 310 is in a condition as shown in FIG. 3B, the resource manager 700 extracts three low speed user data-conversion cards 310_1 (used resource amount="55%"), 310_2 ("60%"), and 310_3 ("68%") in ascending order of the used resource amount at the above-mentioned step S13.

Since the necessary resource amount "45%" is within a sum ("117%") of remaining resource amounts of the low speed user data-conversion cards 310_1-310_3 (respectively "45%", "40%", and "32%") and a resource amount "15%" (=necessary resource amount "45%"/number of distributing destination cards "3") in evenly securing the necessary resource amount at each of the low speed user data-conversion cards 310_1-310_3 is within each of remaining resource amounts "45%", "40%", and "32%" of the low speed user data-conversion cards 310_1-310_3, the resource manager 700 determines that the resource can be acquired at the above-mentioned steps S14 and S15.

In this case, the resource manager 700 notifies to the call controller 600 the resource acquirement response ACK1 set with the "presence of distribution control", distributing destination card IDs ("310_1"-"310_3"), and the number ("3") of the distributing destination cards (at step S16).

Also, when the distribution control is invalid at the above-mentioned step S12, or when determining that no resource can be acquired at either the above-mentioned step S14 or S15, the resource manager 700 notifies to the call controller 600 the resource acquirement NG (at step S17). However, this resource acquirement NG is notified only when the transmission amount of the packet data SDU or the number of the used channels CH is extremely large since each low speed user data-conversion card 310 has a resource amount for processing the packet data SDU transmitted by a sufficient data amount within the output transmission rate of the user data.

I.2.1.3. Operation Example (1) of Low Speed User Data Converter 300L (Call Setup Processing): FIG. 4

As shown in FIG. 4, when receiving the call setup instructions INS1 from the call controller 600 (at step S20), the low speed user data converter 300L performs the call setup processing (at step T1).

Namely, the low speed user data converter 300L secures the resource of the low speed user data-conversion card 310 corresponding to the distributing destination card ID instructed by the call setup instructions INS1 (namely, updates the used resource amount of the resource management database DB shown in FIG. 3B) (at step S21).

Also, at the above-mentioned step S20, when receiving instructions other than the call setup instructions INS1 (namely, when receiving the packet data SDU from the core network 10 or the user data from the mobile equipment 40), the low speed user data converter 300L performs the user data division or the packet data assembling as will be described later (at step T2).

I.2.1.4. Operation Example [1] of Packet Data Distribution Controller 900: FIGS. 5A-5C As shown in FIG. 5A, when receiving the distribution setup instructions INS2 which indicates the "presence of distribution control" from the call controller 600 (at step S30), the packet data distribution controller 900 sets a value indicating the "presence of distribution control" (e.g. value "99" different from card IDs "310_1"-"310_j" of the low speed user data-conversion cards) to "transferring destination card ID" corresponding to the channel ID instructed by the distribution setup instructions INS2 in the packet data transferring destination card table TBL1 shown in FIG. 5B (at step S31).

The packet data distribution controller 900 acquires an vacant index No. (e.g. "0") from the packet data distributing destination card table TBL2 shown in FIG. 5C (at step S32), and sets the vacant index No. acquired to "index No. of packet data distributing destination card table" in the packet data transferring destination card table TBL1 (at step S33).

The packet data distribution controller 900 sets the distributing destination card ID instructed by the distribution setup instructions INS2 to "distributing destination card ID" of corresponding index No. in the packet data distributing destination card table TBL2 (at step S34).

"Distribution counter" in the packet data distributing destination card table TBL2 is for repeatedly counting the number of the distributing destination cards every time the packet data SDU is distributed to the low speed user data-conversion card 310 (namely, repeatedly counting "1"→"2"→"3"→"1"→ . . . , in a case where the number of the distributing destination cards is e.g. "3"). The packet data SDU is sequentially and cyclically distributed to the low speed user data-conversion card 310 of the distributing destination card ID corresponding to a value of the "distribution counter".

Also, at the above-mentioned step S30, when receiving instructions other than the distribution setup instructions INS2, or when receiving the instructions INS2 not indicating the "presence of distribution control" even if they are received, the low speed user data converter 300L performs no processing.

I.2.2. Packet Data Distribution Example: FIGS. 6, 7, 8A, 8B, and 9

A distribution example of the packet data SDU based on the above-mentioned packet data distributing destination setting will now be described.

I.2.2.1. Data/Frame Flow Example [1]: FIGS. 5A-5C, and 6

Figure 6:
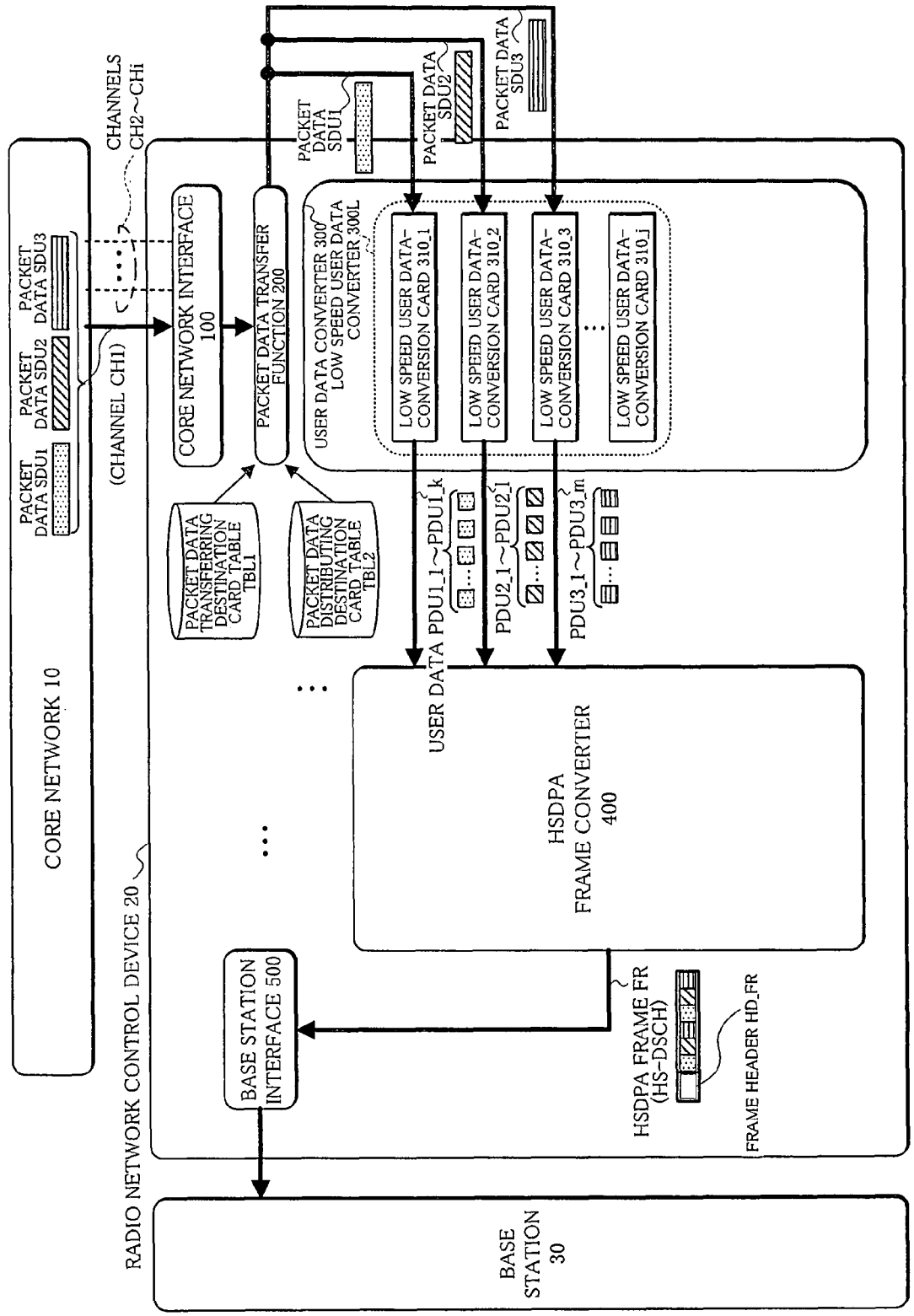
FIG. 6 is a block diagram showing a data/frame flow of an embodiment [1] of the present invention.

FIG. 6 shows a flow example of the packet data SDU, the user data PDU, and the HSDPA frame FR used in this embodiment.

Firstly, an overall operation of the packet data distribution will be described referring to FIG. 6.

When three pieces of packet data SDU1-SDU3 are inputted through the channel CH1 within the channels CH1-CHi from the core network 10 in the example of FIG. 6, the packet data transfer function 200 retrieves the packet data transferring destination card table TBL1 and the packet data distributing destination card table TBL2 set by the above-mentioned packet data distributing destination card setting to distribute the packet data SDU1-SDU3 to the low speed user data-conversion cards 310 forming the distributing destination.

Supposing that the low speed user data-conversion cards 310_1-310_3 are set as the distributing destination card IDs corresponding to the channel ID="CH1" in the tables TBL1 and TBL2, the packet data transfer function 200 sequentially distributes the packet data SDU1-SDU3 to the low speed user data-conversion cards 310_1-310_3.

The low speed user data-conversion cards 310_1-310_3 having received the packet data SDU1-SDU3 respectively divide the packet data SDU1-SDU3 into the user data PDU1_1-PDU1_k, PDU2_1-PDU2_1, and PDU3_1-PDU3_m, and add the card IDs of the cards 310_1-310_3 themselves to each of the user data PDUs to be provided to the HSDPA frame converter 400.

The HSDPA frame converter 400 generates, in the same way as the prior art example, the HSDPA frame FR having the predetermined frame header HD_FR added to the user data PDU1_1-PDU1_k, PDU2_1-PDU2_1, and PDU3_1-PDU3_m to be transmitted to the mobile equipment 40 through the base station interface 500.

Hereinafter, operation examples of the packet data transfer function 200 and the low speed user data converter 300L which realize the packet data distribution, and an assembling example of the packet data SDU in the mobile equipment 40 will be described referring to FIGS. 7, 8A, 8B, and 9.

I.2.2.2. Operation Example [1] of Packet Data Transfer Function 200: FIG. 7

As shown in FIG. 7, when receiving the packet data SDU1 (see FIG. 6) from the core network 10 through the core network interface 100, the packet data transfer function 200 extracts the channel ID="CH1" from the packet data SDU1 having received (at step S40).

The packet data transfer function 200 acquires the "transferring destination card ID" corresponding to the channel ID="CH1" extracted from the packet data transferring destination card table TBL1 shown in FIG. 5B (at step S41).

As mentioned above, since the "transferring destination card ID" indicates the "presence of the distribution control" in a case where the "transferring destination card ID" is set with "99" (at step S42), the packet data transfer function 200 acquires the index No.="0" which is the referring destination within the packet data distributing destination card table TBL2 from the "index No. of packet data distributing destination card table" in the table TBL1 (at step S43) and the value="1" of the "distribution counter" (at step S44).

The packet data transfer function 200 acquires the distributing destination card ID="310_1" according to the value of the "distribution counter" (at step S45), and transfers the packet data SDU1 having received to the low speed user data-conversion card 310_1 (at step S46).

The packet data transfer function 200 increments the value of the "distribution counter" by "1" (at step S47).

Thus, the value of the "distribution counter" assumes "2". Therefore, when the next packet data SDU2 is received, the packet data SDU2 is transferred to the low speed user data-conversion card 310_2. Also, similarly, the packet data SDU3 is transferred to the low speed user data-conversion card 310_3.

Then, the packet data transfer function 200 determines whether or not the value of the "distribution counter" reaches the number of distributing destination cards ("3" in this example) (at step S48). When it is found that the number of the distributing destination cards is reached, the packet data transfer function 200 initializes the "distribution counter" (sets the value thereof to "1") (at step S49).

Thus, when packet data SDU (not shown) following the packet data SDU3 is inputted through the channel CH1 or packet data SDU is newly inputted, the packet data SDU is sequentially and cyclically transferred to the low speed user data-conversion cards 310_1-310_3 similarly.

Also, at the above-mentioned step S42, when the "transferring destination card ID" is not set with "99", the packet data transfer function 200 performs no processing.

I.2.2.3. Operation Example (2) of Low Speed User Data Converter 300L (User Data Division/Packet Data Assembling): FIGS. 8A and 8B As shown in FIG. 8A, when receiving the packet data SDU from the packet data transfer function 200, or when receiving the user data PDU from the mobile equipment 40 (namely, when the uplink packet transmission is performed) (at step S60), the low speed user data converter 300L performs the user data division or the packet data assembling (at step T2).

Namely, when receiving the packet data SDU, the low speed user data-conversion card 310 within the low speed user data converter 300L divides the packet data SDU into the user data PDUs and adds the card ID of the card 310 itself to each of the user data PDUs (at step S61).

The user data PDU is generated, as shown in FIG. 8B, by dividing the packet data SDU into predetermined length data DTs and adding a predetermined header HD to each of the data DTs. For example, the low speed user data-conversion card 310_1 divides the packet data SDU1 into the user data PDU1_1-PDU1_k and adds the card ID="310_1" common to vacant areas of the each header HD.

The low speed user data-conversion card 310 provides the user data PDU to which the card ID is added at the above-mentioned step S62 to the HSDPA frame converter 400 (at step S62).

The HSDPA frame converter 400 makes the user data PDUs a payload PL in the order of reception and per predetermined number prescribed by the HSDPA system, and generates the HSDPA frame FR having the predetermined frame header HD_FR and a CRC (Cyclic Redundancy Checking) added to the payload PL (also adding a padding PAD to each user data PDU if necessary) to be transmitted to the mobile equipment 40 through the base station interface 500.

Also, at the above-mentioned step S60, when receiving the user data PDU from the mobile equipment 40, the low speed user data-conversion card 310 assembles the user data PDU into the packet data SDU in the same way as the prior art example (at step S63), and provides the packet data SDU assembled to the packet data transfer function 200 (at step S64).

The packet data transfer function 200 having received the packet data SDU transmits the packet data SDU to the core network 10 through the core network interface 100.

I.2.2.4. Packet Data Assembling Operation Example of Mobile Equipment: FIG. 9

As shown in FIG. 9, the mobile equipment 40 removes, upon every receipt of the HSDPA frame FR from the radio network device 20, the frame header HD_FR, the CRC, and the padding PAD from the HSDPA frame FR having received, thereby extracting the user data PDUs.

As shown in FIG. 9, when the user data PDUs extracted are received in the order of user data PDU1_1→PDU2_1→PDU3_1→     .     .     . →PDU1_2→PDU1_k→PDU2_l→PDU3_m (namely, when the user data PDU does not accord with the inputted order of the packet data SDU), the mobile equipment 40 sorts the user data PDU1_1-PDU1_k, PDU2_1-PDU2_1, and PDU3_1-PDU3_m in accordance with the card IDs "310_1"-"310_3" added to the vacant area of each header HD, thereby enabling the packet data SDU1-SDU3 to be assembled.

While not shown in the figures, the mobile equipment 40 may receive user data PDUs to which the same card ID is added but divided from a plurality of different packet data SDUs (namely, the packet data SDUs may be distributed to the same low speed user data-conversion card 310). Even in this case, the mobile equipment 40 sorts similarly the user data PDUs having received in accordance with the card ID added to the vacant area of the header HD, thereby enabling the packet data SDUs to be separately assembled based on a packet data length and an identifier indicating a termination of the user data divided or the like set in the header HD in the same way as the prior art example.

II. Embodiment [2]

FIGS. 10, 11, 12A-12C, 13A-13C, 14, and 15

II.1. Arrangement: FIG. 10

A radio network control device 20 shown in FIG. 10 is different from the above-mentioned embodiment [1] in that the user date converter 300 has a high speed user data converter 300H. Also, the high speed user data converter 300H has three high speed user data-conversion cards 320_1-320_3 provided common to the channels CH1-CHi different from the prior art example.

II.2. Operation Example: FIGS. 11, 12A-12C, 13A-13C, 14, and 15

An operation of this embodiment will now be described. Firstly, a setting example of the distributing destination card of the packet data SDU will be described referring to FIGS. 11, 12A-12C, and 13A-13C. Then, a distribution example of the packet data SDU based on the setting will be described referring to FIGS. 14 and 15.

It is to be noted that since the operation of the low speed user data converter 300L is the same as that in the above-mentioned embodiment [1], the description thereof will be omitted.

II.2.1. Packet Data Distributing Destination Setting Example: FIGS. 11, 12A-12C, and 13A-13C II.2.1.1. Operation Example [2] of Call Controller 600: FIG. 11

A processing flow of the call controller 600 shown in FIG. 11 is different from the flow of FIG. 2 in that processes of steps S70-S72 are added.

Namely, when receiving the resource acquirement response ACK1 which indicates "absence of distribution control" from the resource manager 700 (at step S70), the call controller 600 provides to the high speed user data converter 300H the call setup instructions INS1 (at step S71).

In the case of the "absence of distribution control" (which is set ahead of the "presence of distribution control" as will be described later), since an ID of a single high speed user data-conversion card forming a transferring destination of the packet data SDU (hereinafter, referred to as transferring destination card ID) and a resource amount which can be secured in the transferring destination card are set in the resource acquirement response ACK1, the call controller 600 instructs the transferring destination card ID and the resource amount for the call setup instructions INS1.

Thus, in the high speed user data converter 300H, the call setup processing (namely, securing a resource of the high speed user data-conversion card 320 corresponding to the transferring destination card ID instructed by the call setup instructions INS1) is to be performed (not shown).

The call controller 600 provides to the packet data distribution controller 900 the distribution setup instructions INS2 for instructing the channel ID extracted in the same way as the above-mentioned embodiment [1], as well as the "absence of distribution control" and the transferring destination card ID notified by the above-mentioned resource acquirement response ACK1 (at step S72).

Thus, in the packet data distribution controller 900, setting the packet data transferring destination card table TBL1 as will be describer later is to be performed.

II.2.1.2. Operation Example [2] of Resource Manager 700 (Preference for High Speed User Data-Conversion Card): FIGS. 12A-12C A processing flow of the packet data distribution controller 900 shown in FIG. 12A is different from the flow shown in FIG. 3A in that processes of steps S80-S82 are added. A resource management database DB shown in FIG. 12C is different from the database shown in FIG. 3B in that a used resource amount of the high speed user data converter 300H is added.

After extracting the necessary resource amount from the resource acquirement request REQ1 having received from the call controller 600 at the step S10, the resource manager 700 preferentially refers to the used resource amount of the high speed user data converter 300H in the resource management database DB (at step S80).

The resource manager 700 determines whether or not the resource can be acquired based on the used resource amounts of the high speed user data-conversion cards 320_1-320_3 in the high speed user data converter 300H (namely, whether or not the necessary resource amount extracted at the abovementioned step S10 is within the remaining resource amounts of any one of the high speed user data-conversion cards 320_1-320_3) (at step S81).

At the above-mentioned step S81, when determining that the resource can be acquired, the resource manager 700 notifies to the call controller 600 the resource acquirement response ACK1 set with the "absence of distribution control" and the transferring destination card ID (at step S82).

On the other hand, when determining that no resource can be acquired, the resource manager 700 switches the referring destination of the resource management database DB over to the used resource amount of the low speed user data converter 300L from that of the high speed user data converter 300H, thereby performing the same processes as the above-mentioned embodiment [1].

II.2.1.3. Operation Example [2] of Packet Data Distribution Controller 900: FIGS. 13A-13C A processing flow of the packet data distribution controller 900 shown in FIG. 13A is different from the flow shown in FIG. 5A in that a process of step S90 is added.

Namely, when receiving the distribution setup instructions INS2 which indicates the "absence of distribution control", the packet data distribution controller 900 sets the transferring destination card ID instructed by the distribution setup instructions INS2 to the "transferring destination card ID" corresponding to the channel ID instructed by the distribution setup instructions INS2 in the packet data transferring destination card table TBL1 shown in FIG. 13B (at step S90).

II.2.2. Packet Data Distribution Example: FIGS. 14 and 15

Hereinafter, a distribution example of the packet data SDU based on the above-mentioned packet data distributing destination setting will be described.

II.2.2.1. Data/Frame Flow Example [2]: FIG. 14

FIG. 14 shows a flow example of the packet data SDU, the user data PDU, and the HSDPA frame FR used in this embodiment.

Firstly, an overall operation of the packet data distribution will be described referring to FIG. 14.

When three pieces of packet data SDU1-SDU3 are inputted through the channel CH3 within the channels CH1-CHi from the core network 10 in the example of FIG. 14, the packet data transfer function 200 refers to the packet data transferring destination card table TBL1 set by the above-mentioned packet data distributing destination card setting, and transfers the packet data SDU1-SDU3 to the high speed user data-conversion card 320 forming the transferring destination.

Supposing that the high speed user data-conversion card 320_1 is set as the transferring destination card ID corresponding to the channel ID="CH3" in the tables TBL1, the packet data transfer function 200 transfers the packet data SDU1-SDU3 to the high speed user data-conversion card 320_1.

The high speed user data-conversion cards 320_1 divides the packet data SDU1-SDU3 into the user data PDU1_1-PDU1_k, PDU2_1-PDU2_1, and PDU3_1-PDU3_m to be provided to the HSDPA frame converter 400 in the same way as the prior art example. Thus, the HSDPA frame FR generated by the HSDPA frame converter 400 is transmitted to the mobile equipment 40 through the base station interface 500.

Also, when every resource of the high speed user data-conversion cards 320_1-320_3 is insufficient (namely, when the "presence of distribution control" ("99") is set as the transferring destination card ID in the packet data transferring destination card table TBL1), the packet data SDU1-SDU3 are distributed to the low speed user data-conversion card 310 in the same way as the above-mentioned embodiment [1].

Hereinafter, an operation example of the packet data transfer function 200 which realizes the packet data distribution will be described referring to FIG. 15. It is to be noted that since the assembling operation in the mobile equipment 40 is the same as that in the prior art example, the description thereof is omitted herebelow.

II.2.2.2. Operation Example [2] of Packet Data Transfer Function 200: FIG. 15

A processing flow of the packet data transfer function 200 shown in FIG. 15 is different from the flow shown in FIG. 7 in that a process of step S100 is added.

Namely, when receiving the packet data SDU1-SDU3 from the core network 10 through the channel CH3 as shown in FIG. 14, the packet data transfer function 200 acquires the "transferring destination card ID"="320_1" corresponding to the channel ID="CH3" from the packet data transferring destination card table TBL1 shown in FIG. 13B at step S41.

In this case, at step S42, when determining that the "transferring destination card ID" is not set with "99", the packet data transfer function 200 transfers the packet data SDU1-SDU3 having received to the high speed user data-conversion card 320_1 (at step S100).

Also, when the "transferring destination card ID" is set with "99", the packet data transfer function 200 executes the operation of steps S43-S49 in the same way as the above-mentioned embodiment [1], thereby distributing the packet data SDU1-SDU3 to the low speed user data-conversion card 310.

It is to be noted that the present invention is not limited by the above-mentioned embodiments, and it is obvious that various modifications may be made by one skilled in the art based on the recitation of the claims.

What is claimed is:

1. A packet transmission device comprising:
a plurality of first converters provided common to a plurality of channels, each of the first converters dividing input packet data into packet data of a given length to be outputted;
a distributor extracting, when the input packet data is received through a single arbitrary channel, a number of the plurality of the first converters with the number corresponding to a ratio of a transmission rate of the packet data of the given length to a transmission rate of the input packet data, and sequentially and cyclically distributing the input packet data to the extracted first converters; and
a multiplexer multiplexing the packet data of the given length outputted from the extracted first converters into a single channel to be outputted,
wherein the distributor extracts the number of the plurality of the first converters in ascending order of a used resource amount of the plurality of the first converters, and performs the distributing when a remaining resource amount of the extracted first conversion means is larger than a transmission amount designated in the input packet data.

2. The packet transmission device as claimed in claim 1, wherein the plurality of the first converters includes an adder adding, every time the distributed packet data is divided into the packet data of the given length, an identifier of the plurality of the first converters to each of the packet data of the given length.

3. The packet transmission device as claimed in claim 1, wherein the multiplexer converts the packet data of the given length into a frame of HSDPA (High Speed Downlink Packet Access) system.

4. A packet transmission device comprising:
a plurality of first converters provided common to a plurality of channels, each of the first converters dividing input packet data into packet data of a given length to be outputted;
a distributor extracting, when the input packet data is received through a single arbitrary channel, a number of the plurality of the first converters with the number corresponding to a ratio of a transmission rate of the packet data of the given length to a transmission rate of the input packet data, and sequentially and cyclically distributing the input packet data to the extracted first converters; and
a multiplexer multiplexing the packet data of the given length outputted from the extracted first converters into a single channel to be outputted,
wherein the distributor extracts the number of the plurality of the first converters in ascending order of a used resource amount of the plurality of the first converters, and performs the distributing only when a sum of remaining resource amounts of the extracted first converters is larger than a transmission amount designated in the input packet data and each of the remaining resource amounts of the extracted first converters is larger than a value obtained by dividing the transmission amount by the number corresponding to the ratio.

5. The packet transmission device as claimed in claim 4, further comprising at least a single second converter provided common to the plurality of channels, dividing the input packet data into the packet data of the given length and outputting the packet data of the given length at a transmission rate more than the transmission rate of the input packet data,
the distributor preferentially providing the input packet data to the second converter and, upon detecting that a remaining resource amount of the second converter is insufficient for the transmission amount, switching from the second converter to the extracted first converters to distribute the input packet data.

6. A control method of a packet transmission device comprising:
extracting, when input packet data is received through a single arbitrary channel among a plurality of channels, from among a plurality of first conversion cards which are provided common to the channels and respectively divide the input packet data into packet data of a given length to be outputted from each of the plurality of the first conversion cards, a number of the plurality of first conversion cards with the number corresponding to a ratio of a transmission rate of the packet data of the given length to a transmission rate of the input packet data;
sequentially and cyclically distributing the input packet data to the extracted first conversion cards; and
multiplexing the packet data of the given length outputted from the extracted first conversion cards into a single channel to be outputted,
wherein the extracting comprises extracting the number of the plurality of the first conversion cards in ascending order of a used resource amount of the plurality of the first conversion cards, and the sequentially and cyclically distributing comprises distributing when a remaining resource amount of the extracted first conversion cards is larger than a transmission amount designated in the input packet data.

7. The control method of the packet transmission device as claimed in claim 6, wherein the multiplexing comprises converting the packet data of the given length into a frame of HSDPA (High Speed Downlink Packet Access) system.

8. A control method of a packet transmission device comprising:
extracting, when input packet data is received through a single arbitrary channel among a plurality of channels, from among a plurality of first conversion cards which are provided common to the channels and respectively divide the input packet data into packet data of a given length to be outputted from each of the plurality of the first conversion cards, a number of the plurality of first conversion cards with the number corresponding to a ratio of a transmission rate of the packet data of the given length to a transmission rate of the input packet data;
sequentially and cyclically distributing the input packet data to the extracted first conversion cards; and
multiplexing the packet data of the given length outputted from the extracted first conversion cards into a single channel to be outputted,
wherein the extracting comprises extracting the number of the plurality of the first conversion cards in ascending order of a used resource amount of the plurality of the first conversion cards, and the sequentially and cyclically distributing comprises distributing only when a sum of remaining resource amounts of the extracted first conversion cards is larger than a transmission amount designated in the input packet data and each of the remaining resource amounts of the extracted first conversion cards is larger than a value obtained by dividing the transmission amount by the number corresponding to the ratio.

9. The control method of the packet transmission device as claimed in claim 8, wherein the sequentially and cyclically distributing comprises preferentially providing the input packet data to at least a single second conversion card which is provided common to the plurality of channels, dividing the input packet data into the packet data of the given length, and outputting the packet data of the given length at a transmission rate more than the transmission rate of the input packet data and, upon detecting that a remaining resource amount of the second conversion card is insufficient for the transmission amount, switching from the second conversion card to the extracted first conversion cards to distribute the input packet data.

10. A packet transmission device comprising:
a plurality of first conversion parts provided common to a plurality of channels, each of the first conversion parts dividing input packet data into packet data of a given length to be outputted;
a distribution part extracting, when the input packet data is received through a single arbitrary channel, a number of the plurality of the first conversion parts with the number corresponding to a ratio of a transmission rate of the packet data of the given length to a transmission rate of the input packet data, and sequentially and cyclically distributing the input packet data to the extracted first conversion parts; and a multiplex part multiplexing the packet data of the given length outputted from the extracted first conversion parts into a single channel to be outputted, wherein the distribution part extracts the number of the plurality of the first conversion parts in ascending order of a used resource amount of the plurality of the first conversion parts, and performs the distributing when a remaining resource amount of the extracted first conversion parts is larger than a transmission amount designated in the input packet data.

11. The packet transmission device as claimed in claim 10, wherein the plurality of the first conversion parts includes a part adding, every time the distributed packet data is divided into the packet data of the given length, an identifier of the plurality of the first conversion parts to each of the packet data of the given length.

12. The packet transmission device as claimed in claim 10, wherein the multiplex part converts the packet data of the given length into a frame of HSDPA (High Speed Downlink Packet Access) system.

13. A packet transmission device comprising:

a plurality of first conversion parts provided common to a plurality of channels, each of the first conversion parts dividing input packet data into packet data of a given length to be outputted;

a distribution part extracting, when the input packet data is received through a single arbitrary channel, a number of the plurality of the first conversion parts with the number corresponding to a ratio of a transmission rate of the packet data of the given length to a transmission rate of the input packet data, and sequentially and cyclically distributing the input packet data to the extracted first conversion parts; and a multiplex part multiplexing the packet data of the given length outputted from the extracted first conversion parts into a single channel to be outputted, wherein the distribution part extracts the number of the plurality of the first conversion parts in ascending order of a used resource amount of the plurality of the first conversion parts, and performs the distributing only when a sum of remaining resource amounts of the extracted first conversion parts is larger than a transmission amount designated in the input packet data and each of the remaining resource amounts of the extracted first conversion parts is larger than a value obtained by dividing the transmission amount by the number corresponding to the ratio.

14. The packet transmission device as claimed in claim 13, further comprising at least a single second conversion part provided common to the plurality of channels, dividing the input packet data into the packet data of the given length and outputting the packet data of the given length at a transmission rate more than the transmission rate of the input packet data, the distribution part preferentially providing the input packet data to the second conversion part and, upon detecting that a remaining resource amount of the second conversion part is insufficient for the transmission amount, switching from the second conversion part to the extracted first conversion parts to distribute the input packet data.

* * * * *